US010064167B1

(12) United States Patent
Felstaine et al.

(10) Patent No.: US 10,064,167 B1
(45) Date of Patent: Aug. 28, 2018

(54) SYSTEM, METHOD, AND COMPUTER PROGRAM FOR COORDINATING A PLURALITY OF NETWORKS BASED ON NETWORK FUNCTION VIRTUALIZATION (NFV)

(71) Applicant: Amdocs Development Limited, Limassol (CY)

(72) Inventors: Eyal Felstaine, Hertzeliya (IL); Ofer Hermoni, Yavne (IL); Itzik Kitroser, Beer Sheva (IL); Nimrod Sandlerman, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 193 days.

(21) Appl. No.: 15/081,746

(22) Filed: Mar. 25, 2016

Related U.S. Application Data

(60) Provisional application No. 62/138,897, filed on Mar. 26, 2015.

(51) Int. Cl.
  *G06F 15/173* (2006.01)
  *H04W 72/04* (2009.01)
  *H04W 12/06* (2009.01)
  *H04W 4/00* (2018.01)
  *H04W 4/60* (2018.01)

(52) U.S. Cl.
  CPC ....... *H04W 72/0413* (2013.01); *H04W 4/003* (2013.01); *H04W 4/60* (2018.02); *H04W 12/06* (2013.01)

(58) Field of Classification Search
  CPC .. G06F 2009/45595; G06F 9/50; G06F 21/34; G06F 21/44; G06F 9/5077; H04W 12/06; H04W 16/14; H04L 63/0853; H04L 12/4625; H04L 12/569
  USPC ........ 709/223, 225, 226, 227, 229; 455/411, 455/450, 452.1, 558; 726/1, 2, 3, 4, 9, 726/26, 27
  See application file for complete search history.

(56) References Cited

U.S. PATENT DOCUMENTS

2007/0036139 A1\* 2/2007 Patel ................... H04L 63/0807
  370/352
2008/0107059 A1\* 5/2008 Takeda .................. H04B 7/026
  370/312

(Continued)

*Primary Examiner* — Dustin Nguyen
*Assistant Examiner* — Hao Nguyen
(74) *Attorney, Agent, or Firm* — Zilka-Kotab, P.C.

(57) ABSTRACT

A system, method, and computer program product are provided for coordinating a plurality of networks based on network function virtualization (NFV). This includes controlling, by a first network function virtualization based communication network (NFV-based network), a resource provided by a second NFV-based network, comprising: communicating a request for a resource control, the request being transmitted by the first NFV-based network to the second NFV-based network; communicating an authorization for the request for the resource control, the authorization being received by the first NFV-based network from the second NFV-based network; and communicating a control instruction associated with the resource, the control instruction being associated with the authorization, and the control instruction being transmitted by the first NFV-based network to the second NFV-based network.

16 Claims, 14 Drawing Sheets

(56) References Cited

U.S. PATENT DOCUMENTS

| | | | |
|---|---|---|---|
| 2008/0200147 A1* | 8/2008 | Nylander | H04L 63/0853 455/411 |
| 2010/0085914 A1* | 4/2010 | Kunniyur | H04L 65/1016 370/328 |
| 2014/0201374 A1* | 7/2014 | Ashwood-Smith | H04L 49/70 709/226 |
| 2015/0288767 A1* | 10/2015 | Fargano | H04L 43/08 709/227 |
| 2015/0332357 A1* | 11/2015 | McBride | G06Q 30/0601 705/26.1 |
| 2016/0088487 A1* | 3/2016 | Yu | H04W 16/14 370/329 |
| 2016/0105332 A1* | 4/2016 | Xiang | H04L 41/5045 709/226 |
| 2017/0223542 A1* | 8/2017 | Zhang | H04L 63/0435 |
| 2017/0257276 A1* | 9/2017 | Chou | H04L 41/0896 |

* cited by examiner

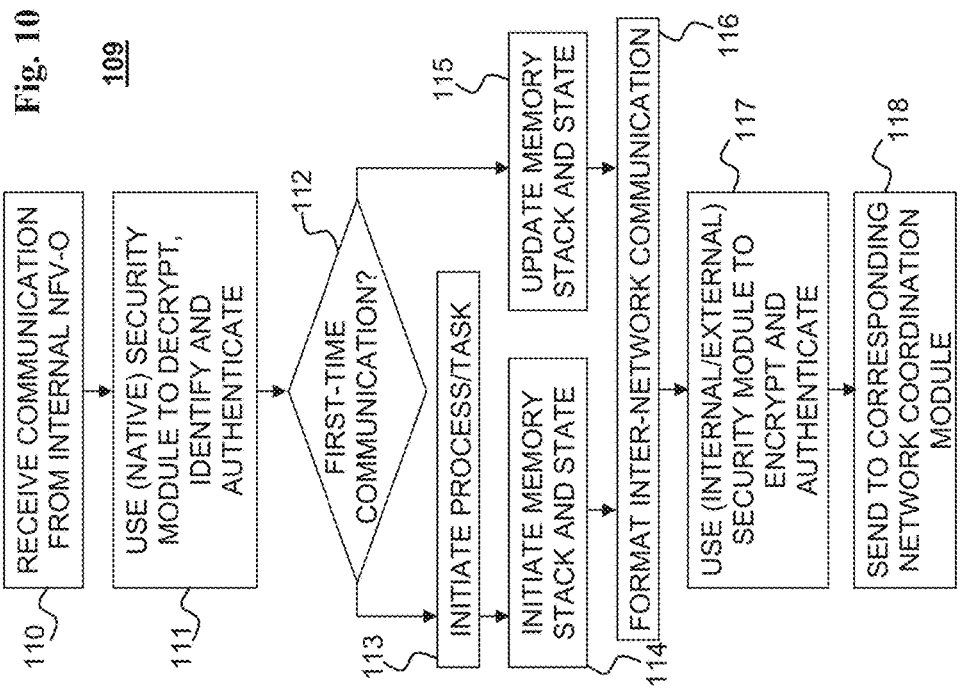
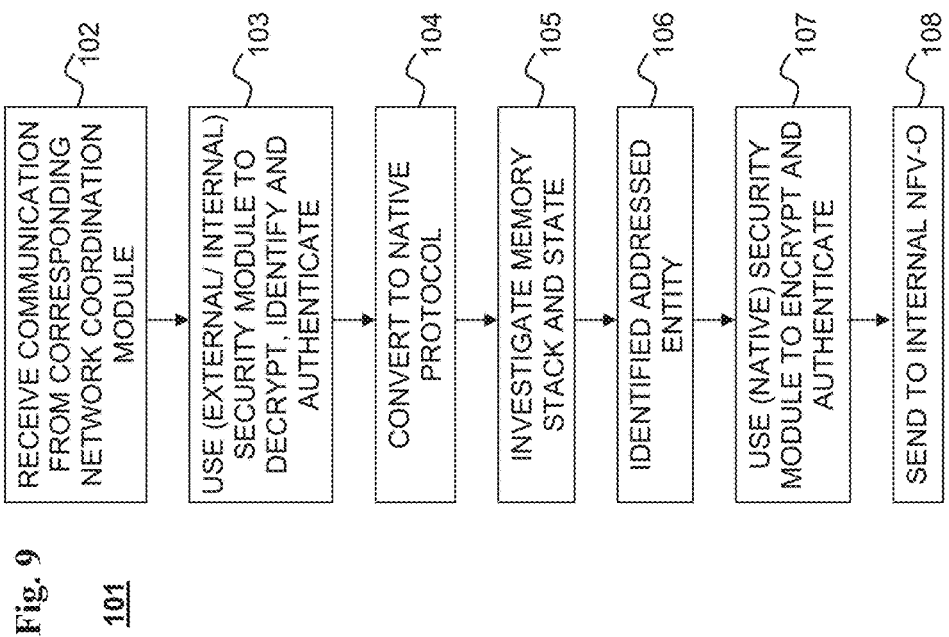

SYSTEM, METHOD, AND COMPUTER PROGRAM FOR COORDINATING A PLURALITY OF NETWORKS BASED ON NETWORK FUNCTION VIRTUALIZATION (NFV)

CLAIM OF PRIORITY

This application claims the benefit of U.S. Provisional Application No. 62/138,897, filed Mar. 26, 2015, the entire contents of which are incorporated herein by reference.

FIELD OF THE INVENTION

The present invention relates to telecommunications (telecom) and/or data communications and, more particularly, but not exclusively to network function virtualization (NFV) of telecom networks, and, more particularly, but not exclusively to coordinating the operation of a plurality of communication networks using network function virtualization, and even more particularly, but not exclusively to orchestrating a service deployed over a plurality of NFV-based networks.

BACKGROUND

Network Function Virtualization is a term or a name of a proposed architecture of telecom services as published by the European Telecommunications Standards Institute (ETSI) in a series of documents available from the ETSI website. The purpose of NFV is separate the software from the hardware. NFV uses a generic hardware platform and software adapted for the generic hardware platform. Thus, NFV creates a network much more flexible and dynamic than a legacy communication network. In NFV-based networks, a service is based on one or more virtual network functions or features (VNF) that can be executed on any generic hardware processing facility. Therefore, VNFs are installed, removed, and moved between hardware facilities, much more easily, less costly and thus, more frequently.

The NFV-based network is managed by a software program including an NFV orchestration (NFV-O) component. Typically, the NFV-O is responsible for installing, activating, and deactivating VNFs and VNF instances, as well as other functions of the NFV-based network. If two NFV-based networks should be connected, their respective NFV-Os should coordinate their functionality and activities. There is thus a need for addressing these and/or other issues associated with the prior art.

SUMMARY

A system, method, and computer program product are provided for coordinating a plurality of networks based on network function virtualization (NFV). This includes controlling, by a first network function virtualization based communication network (NFV-based network), a resource provided by a second NFV-based network comprising: communicating a request for a resource control, the request being transmitted by the first NFV-based network to the second NFV-based network; communicating an authorization for the request for the resource control, the authorization being received by the first NFV-based network from the second NFV-based network; and communicating a control instruction associated with the resource, the control instruction being associated with the authorization, and the control instruction being transmitted by the first NFV-based network to the second NFV-based network.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Embodiments of the invention are herein described, by way of example only, with reference to the accompanying drawings. With specific reference now to the drawings in detail, it is stressed that the particulars shown are by way of example and for purposes of illustrative discussion of several embodiments of the present invention only, and are presented in order to provide what is believed to be a useful and readily understood description of the principles and conceptual aspects of the invention. In this regard, no attempt is made to show structural details of the invention in more detail than is necessary for an understanding of the invention, the description taken with the drawings making apparent to those skilled in the art how the several forms of the invention may be embodied in practice.

In the drawings:

FIG. 9 is a simplified flow chart of a process for receiving an inter-network communication, in accordance with one embodiment;

FIG. 10 is a simplified flow chart of a process for sending an inter-network communication, in accordance with one embodiment;

DETAILED DESCRIPTION

Figure 1:
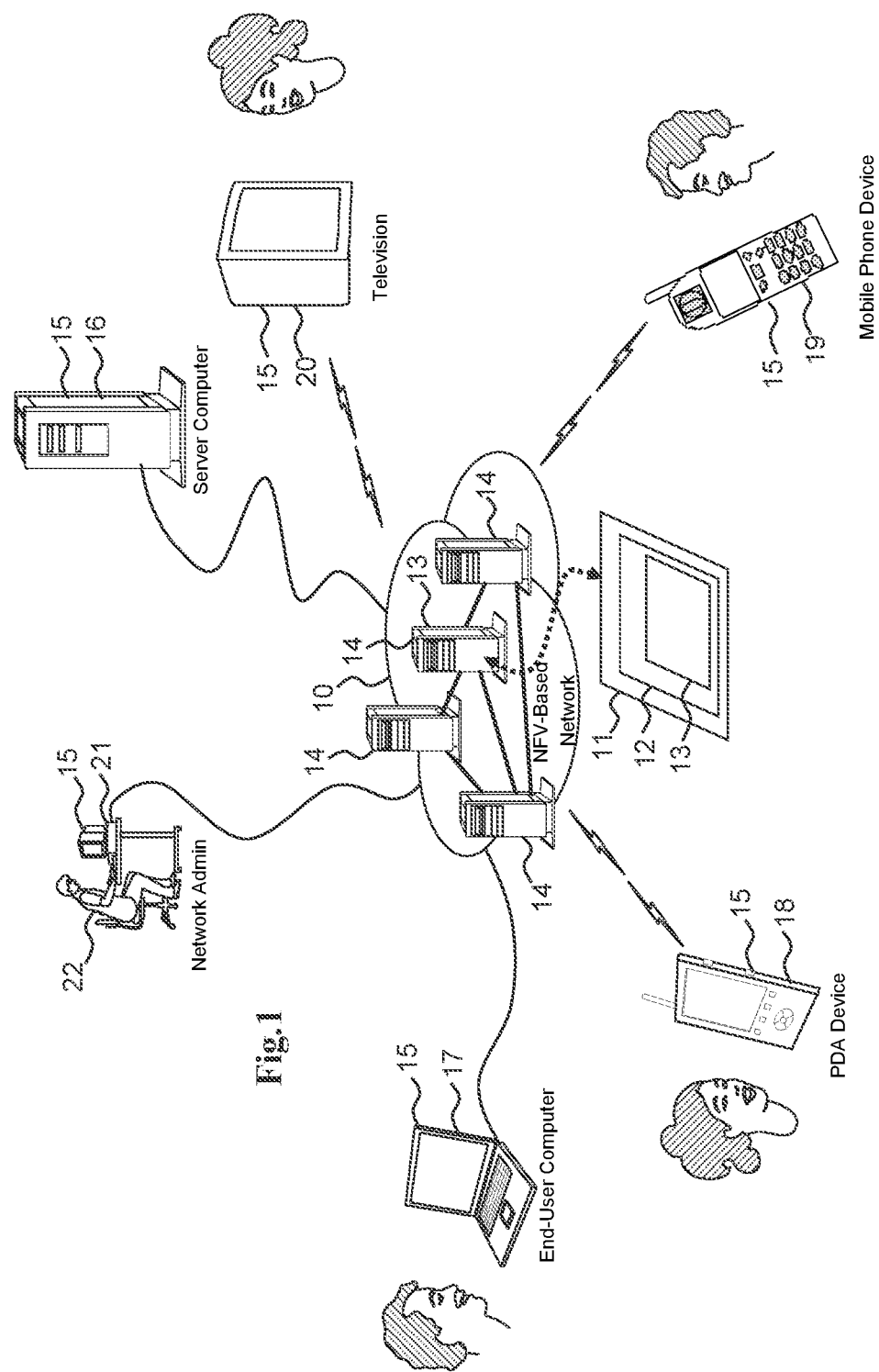
FIG. 1 is a simplified illustration of an NFV-based communication network including a chain optimization module, in accordance with one embodiment.

The present embodiments comprise a system, method, and computer program product for to coordinating the operation of a plurality of communication networks using network function virtualization, and, more particularly, but not exclusively, to orchestrating a service deployed over a plurality NFV-based networks.

The terms "network" and "communication network" refer to the hardware and software connecting one or more communication terminals including wireline networks, wireless networks, and combinations thereof.

The terms "network function virtualization" (NFV) and virtual network function (NFV) are described in a series of documents published by the European Telecommunications Standards Institute (ETSI) and available from the ETSI website.

The term "virtual network function or feature (VNF)" refers to a particular implementation of a function, a feature, or a service provided by the network, internally within the network, or externally to a customer, subscriber, end-user, a terminal or a server. The term VNF refers to the software program implementation of the function or feature or service. The term VNF instance (VNF-I) refers to a particular process or task executing the VNF program by a particular processor or computing facility and/or used by a particular customer (or subscriber, end-user, terminal or server).

The term "service" refers to any type of use (such as a use case) that a NFV-based communication network may offer or provide to one or more communication terminals. A service may include switching data or content between any number of terminals, providing content from a server to a terminal or between servers, securing and protecting communication and content, processing content provided by the customer or by a third party, providing backup and redundancy, etc. A service typically includes one or more VNFs and/or one or more VNF instances forming a service sub-network. In this document the term "chain" typically refers to such service sub-network, such a particular plurality of VNFs and/or VNF instances associated with a particular service type or a service instance.

The term "deployment", when referring to hardware elements, including processing elements, memory elements, storage elements, connectivity (communication) elements, etc., refers to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of a plurality of VNF instances making a particular service. The terms chain optimization and service optimization may thus be used interchangeably.

The term "session" refers to a communication connection between two or more entities that persists for a period of time during which data may be exchanged there between. A session is typically implemented and managed by a session layer in the corresponding network protocol. The term session may include a network session and a logical session. The network session is typically associated with the devices used to communicate, while the logical session is associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" applies that the session or the service is not interrupted, or that an interruption is short enough that a user is not aware of such interruption, or that the interruption does not cause any loss of data.

The term "availability" or "service availability" refers to a level of the service, or a characteristic of the service, in which the service provider should provide the service albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a network fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply to, but is not limited to, hardware, software, data and/or content.

The principles and operation of a system, method, and computer program product for coordinating the operation and/or orchestration of two or more NFV-based networks according to embodiments of the present invention may be better understood with reference to the following drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Reference is now made to FIG. 1, which is a simplified illustration of an NFV-based communication network 10 including an NFV management system 11, an NFV-orchestration (NFV-O) module 12, and an inter-network coordination module 13, according to one embodiment.

As seen in FIG. 1, at least one NFV-based network 10 is provided. In the context of the present network architecture, the NFV-based network 10 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based network 10 may be provided.

NFV-based network 10 typically includes one or more computation facilities 14, each including one or more hardware units and interconnected by communication links to form the NFV-based network 10. At least one of the computation facilities 14 includes NFV management system 11. NFV management system 11 typically includes NFV-O module 12 and inter-network coordination module 13.

Inter-network coordination module 13 is typically a part or a components of NFV-O module 12. However, inter-network coordination module 13, NFV-O module 12 and NFV management system 11 may be separate software programs, and may be provided by different vendors. NFV-based network 10 may even have a plurality of any of NFV management systems 11, NFV-O modules 12 and/or inter-network coordination modules 13.

Coupled to NFV-based network 10 is a plurality of devices 15. For example, a server computer 16 and a computer or terminal 17 may be coupled to the network NFV-based network 10 for communication purposes. Such end-user computer or terminal 17 may include a desktop computer, a lap-top computer, and/or any other type of logic or data processing device. Still yet, various other devices may be coupled to the network NFV-based network 10 including a personal digital assistant (PDA) device 18, a mobile phone device 19, a (cable, aerial, mobile, satellite) television 20, etc. Typically these devices 15 are owned and/or operated by end-users, subscribers and/or customers of NFV-based network 10. Other devices 15, such as administration station 21, is typically owned and/or operated by the operator of the NFV-based network 10.

Network administrator 22 typically supervises at least some aspects of the operation of the NFV-based network 10 by controlling an NFV infrastructure including NFV management system 11, NFV-O 12, and inter-network coordination module 13.

Figure 2:
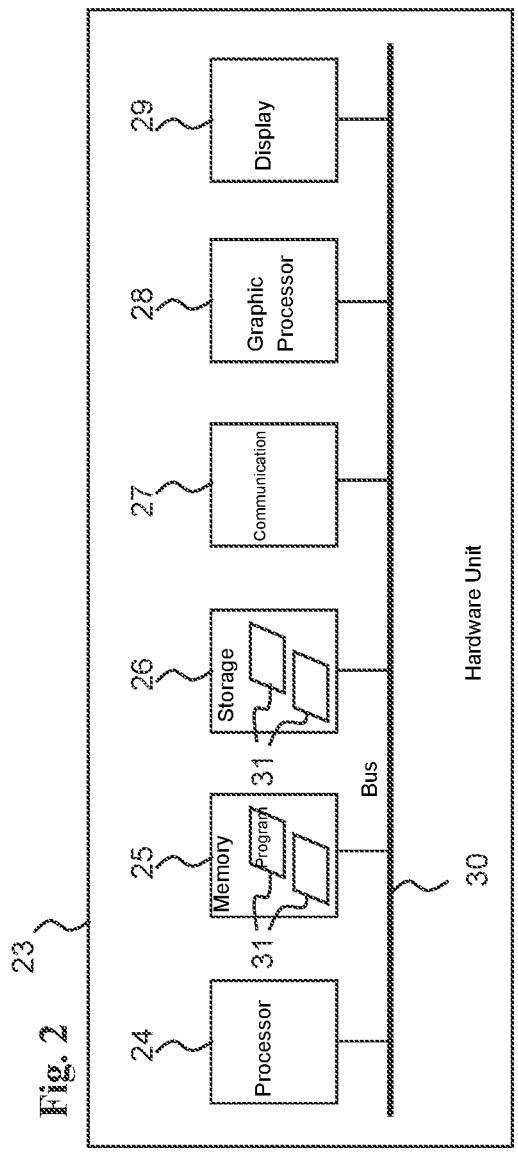
FIG. 2 is a simplified block diagram of a hardware unit of an NFV-based network, in accordance with one embodiment.

Reference is now made to FIG. 2, which is a simplified block diagram of a hardware unit 23 of an NFV-based network 10 according to one embodiment of the present invention.

Hardware unit 23 is typically a computing facility 14 of FIG. 1 or a part of computing facility 14. Hardware unit 23 is typically a computing machine. The term computing machine relates to any type or combination of computing devices, or computing-related units, including, but not limited to, a processing device, a memory device, a storage device, and/or a communication device. Hardware unit 23 can therefore be a network server, and computing facility 14 can be a plurality of network servers, or a data-center, including cloud-based infrastructure. As an option, the hardware unit 23 may be implemented in the context of any of the devices of the NFV-based network 10 of FIG. 1 and/or FIG. 5 and in any desired communication environment.

Each hardware unit 23 (or computing machine, computing device, computing-related unit, and/or hardware component), including each communication link between such hardware units, is typically associated with one or more performance type and a respective performance rating or value, where the hardware unit and/or communication link is operative to provide the performance value. Performance types are, for example, processing power, cash memory capacity, regular memory capacity (RAM, dynamic, or volatile memory), non-volatile memory (such as flash memory) capacity, storage capacity, power, cooling, bandwidth, bitrate, latency, jitter), bit error rate, packet loss, etc.

Hardware unit 23 is operative to provide computing infrastructure and resources for any type and/or instance of software component executed within the NFV-based network 10. In this regard, hardware unit 23 is operative to process any of the processes described here, including but not limited to, any NFV-related software component and/or process. In this respect hardware unit 23 is operative to process virtual network functions (VNFs), VNF instances, network function virtualization orchestration (NFV-O) software, modules and functions, data center management software, cloud management systems (CMS), etc.

As seen in FIG. 2, the hardware unit 23, in accordance with one embodiment includes: at least one processor unit 24; one or more memory units 25, e.g., random access memory (RAM), a non-volatile memory such as a Flash memory, etc.; one or more storage units 26 including, for example, a hard disk drive and/or a removable storage drive, representing a floppy disk drive, a magnetic tape drive, a compact disk drive, etc. [the removable storage drive reads from and/or writes to a removable storage unit in a well-known manner]; one or more communication units 27; one or more graphic processors 28 and displays 29; one or more communication buses 30 connecting the above units; one or more computer programs 31, or computer control logic algorithms, which may be stored in any of the memory units 25 and/or storage units 26. Such computer programs, when executed, enable hardware unit 23 to perform various functions (to be set forth below, for example). Memory units 25 and/or storage units 26 and/or any other storage are possible examples of tangible computer-readable media.

It is appreciated that computer program 31 may include any of NFV management system 11, NFV-O 12, and inter-network coordination module 13.

Figure 3:
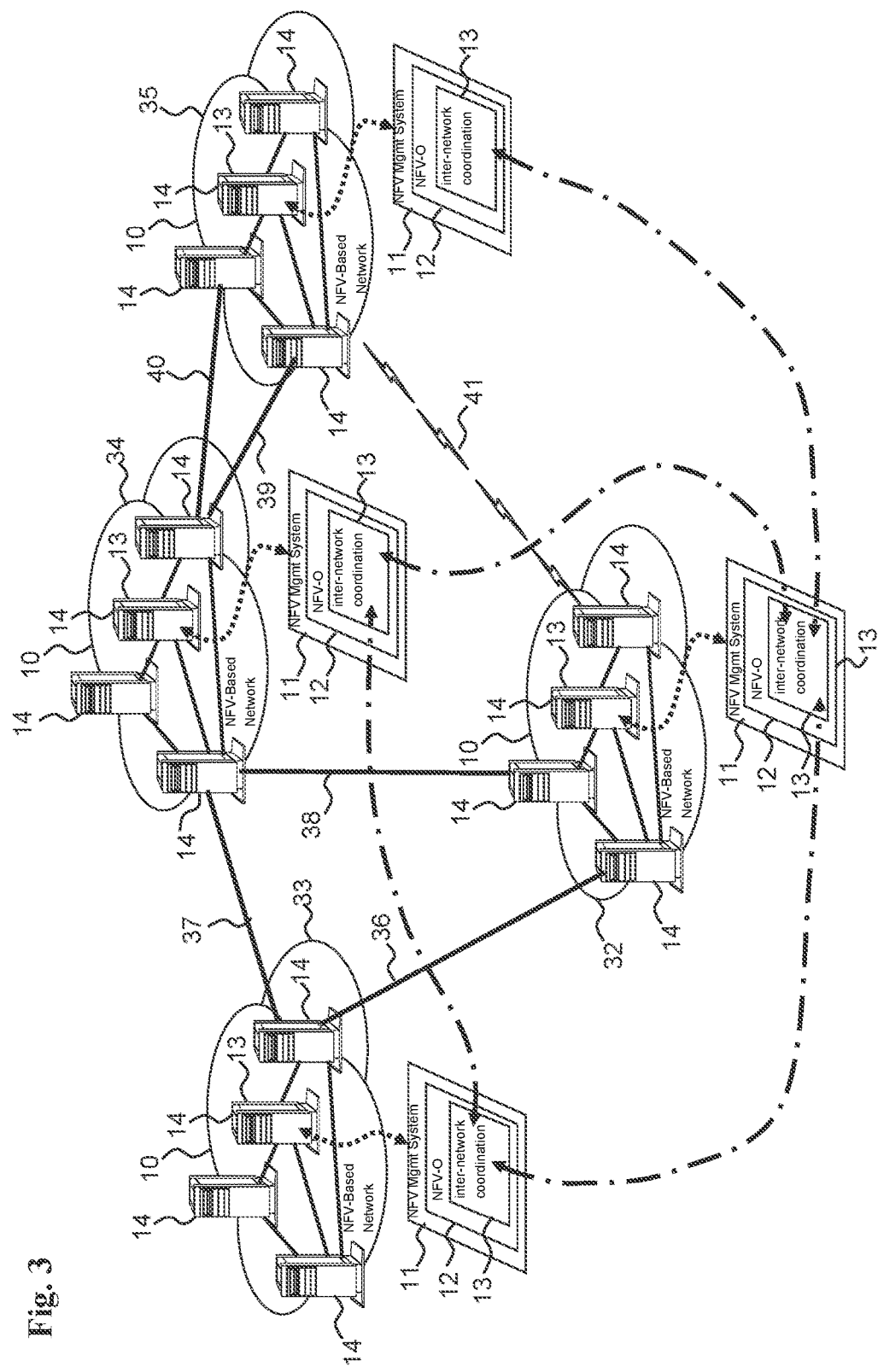
FIG. 3 is a simplified illustration of a plurality of inter-connected NFV-based networks 10, in accordance with one embodiment.

Reference is now made to FIG. 3, which is a simplified illustration of a plurality of inter-connected NFV-based networks 10, according to a preferred embodiment of the present invention.

As seen in FIG. 3, a plurality of NFV-based networks 10 designated by numerals 32, 33, 34, and 35, are interconnected (communicatively coupled) by communication links 36, 37, 38, 39, 40, and 41. Each NFV-based networks 10 includes at least one NFV-O 12 and at least one inter-network coordination module 13. The inter-network coordination module 13 of NFV-based networks 32, 33, 34, and 35 are communicating, typically via the respective communication links.

According to one embodiment, inter-network coordination module 13 is a computer software program for managing coordination between NFV-based network 10 and one or more other NFV-based networks with which NFV-based network 10 is communicatively coupled. Such coordination typically involves: communication between two or more NFV-O 12, between two or more modules of a NFV-O, between two or more NFV-O components, etc.; coordinating the orchestration of functions, or features, of the two or more NFV-based networks 10, including a service provided over two or more NFV-based networks 10; coordinating mutual orchestration and deployment of VNFs in two or more NFV-based networks 10; coordinating the orchestration and provisioning of services provided by VNFs deployed in two or more NFV-based networks 10; coordinating the orchestration and sharing of resources supported by two or more NFV-based networks 10.

Figure 4:
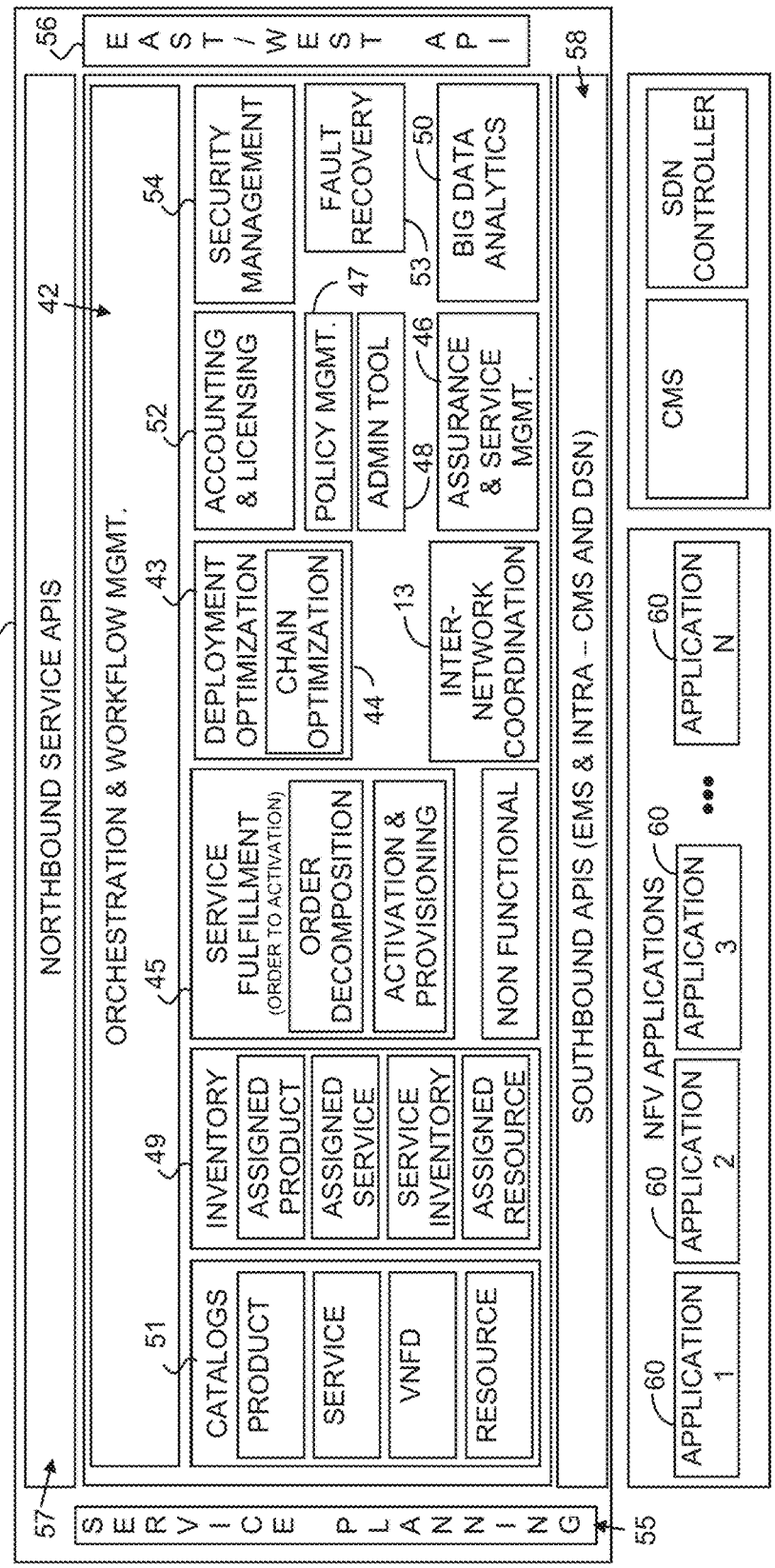
FIG. 4 is a simplified block diagram of NFV-infrastructure including a network function virtualization orchestration layer (NFV-O), including a chain optimization module, in accordance with one embodiment.

Reference is now made to FIG. 4, which is a simplified block diagram of a detail of NFV management system 11, including NFV-O module 12, and inter-network coordination module 13, according to one embodiment.

As seen in FIG. 4, NFV management system 11 typically includes NFV-O module 12 including various parts.

Orchestration and workflow management 42 is responsible for managing (orchestrating) and executing all NFV-O processes, including inbound and/or outbound communication and interfaces.

Deployment optimization module 43 enables a user to devise automatic mechanisms for network optimizations. The deployment optimization module 43 may operate these mechanisms automatically and continuously to optimize the distribution of VNFs 60 and their VNF instances 61 in real-time (or near-real-time) by migrating VNFs 60 and VNF instances 61 between hardware units 23.

Chain optimization module 44 is typically a part of deployment optimization module 43 and enables a user to devise automatic mechanisms for optimizing the deployment of chains or groups of VNFs 60 and VNF instances 61. A service provided by NFV-based network 10 is typically made of a particular chain or group of particular VNFs 60 and their respective VNF instances 61. Chain optimization module 44 optimizes the deployment of chains or groups or services between hardware units 23 according to the requirements and specifications associated with and/or adapted to the particular service, or chain, or a group.

Chain optimization module 44 may operate these mechanisms automatically and continuously to optimize in real-time the operation of chains or groups of VNFs 60 and their VNF instances 61 by re-planning their distribution among hardware units 23 and optionally also by migrating VNFs 60 and VNF instances 61 between hardware units 23.

Service fulfillment module 45 manages service and resource (VNF) instance lifecycle activities as part of the process and orchestration activities. This includes on boarding, initiation (instantiation), installation and configuration, scaling, termination, software update (of running VNF), test environment, and rollback procedure. Additionally, this module may also provide decomposition of an order to multiple network services, and the activation of such network service as a single VNF instance 61, or as a chain of VNF instances 61.

Order decomposition includes translating business orders into network oriented service implementation plan. For example, a business order is decomposed into a plurality of functions, some of which may be provided by different software programs or modules (such as various VNFs 60) instantiated as a plurality of VNF instances 61 across one or more data centers. Performing order decomposition, service fulfillment module 45 typically consults deployment optimization module 43 for the best deployment option to customer order in a given network and resource condition. Performing order decomposition, service fulfillment module 45 then initiates the service including all its components. Order decomposition is performed in several locations across the NFV-O hierarchy, i.e., initial decomposition is performed in the root of the NFV-O, and then further decomposition is performed in the relevant data centers.

Activation and Provisioning provides the plan for activation and provisioning of the service to the orchestration and workflow management. It also provides feedback on fulfillment status to upper layer. This upper layer is typically the business support services (BSS).

Assurance and Service Management module 46 gathers real time data on network elements status and creates a consolidated view of services and network health. The module also triggers events associated with lifecycle management and faults. This module monitors the health of the network and executes fault recovery activities. The assurance module provides the ability to monitor services' status and performance according to the required criteria. The assurance module interacts with the network infrastructure (including computing, storage and networking) to receive the required information, analyses it and acts upon each incident according to the defined policy. The assurance is able to interact with analytics to enrich the policy assurance module. Interfaces are also provided for implementation by an external system.

Policy management module 47 enables a user to define and configure offline and/or real-time policy for controlling VNF and service related rules. The module contains the preconfigured policies and activities as well as selection rules for the NFV-O process to determine the preferred policy or activity to be performed for a particular process event. The policy management is multi-layered, including vendor policy, service policy, operator policy, etc. The policy mechanism triggers the suitable policy layer (vendor/service/operator).

Administration module 48 provides an overall view of the network, manual lifecycle management and intervention, and manual system administration and configuration. The module enables a user such as administrator 22 to manage, view, and operate the NFV-O system. The module also provides a view of the network topology and services, the ability to perform specific activities such as manual lifecycle management, and changing service and connectivity configuration.

Inventory management module 49 maintains a distributed view of deployed services and HW resources. Inventory catalogues reflect the current instantation and allocation of the resources and services within the network mapped into products and/or customer entities.

Big data analytics module 50 analyzes network and service data to support network decisions involving services and subscribers to improve network performance based on actual usage patterns. The module also generates what-if scenarios to support business-oriented planning processes. Additionally the module analyses and evaluates the information for various planning aspects (Virtual Network Capacity Planning, Data Center Capacity Planning, Value based planning, Cost analysis for network deployment alternatives, etc.) deployment and management (Guided Operator Recommendations. What-if scenario analysis and simulation, application rapid elasticity and resource usage optimization etc.), and supports business-oriented planning processes.

A catalog module 51 include records defining various aspects of the network, such as products, services, and resources such as hardware units and VNFs (VNF directory). The catalog module 51 is typically a collection of centralized, hierarchical information repositories containing resource, service and product definitions with their relationship, versioning, descriptors etc. Such records typically include templates enabling a user such as administrator 22 to define particular network components such as resources, products, services, etc. A resource template defines resources descriptors, attributes, activities, procedures, connectivity, etc. A service template defines a service variation from resource building blocks. A product template defines parameters of a sellable product (prices, rating, etc.) based on service composition (this may be part of BSS catalogue).

Inventory management module 49, big data analytics module 50, and/or catalog module 51 may support multiple data centers, multiple CMSs and provide centralized view across the infrastructure. Inventory management module 49, big data analytics module 50, and/or catalog module 51 may also support hybrid networks and services maintaining both physical and virtual resources.

Accounting and licensing module 52 records and manages network software usage data for commercial purposes including licensing, accounting, billing, and reconciliation of services with subscribers and providers. The module manages licensing and usage of virtual network application, ability to support complex rating schemes, based on various parameters such as CPU, memory, data, etc. The module enables users to define the pricing of particular VNF modules and provide settlement with vendors. The module also enables the evaluation of internal costs of services provided within the network for calculating ROI.

Fault recovery module 53 (otherwise named disaster recovery planning module or DRP) enables a user to plan and manage disaster recovery procedures for the NFV-O and the entire network.

Security management module 54 provides the authentication authorization and accounting services of application security across the network.

The authentication module and function (including identity management) authenticates the identity of each user defined in the system. Each user has a unique user identity and password. The system supports password based authentication with flexible password policy. Integration with external authentication providers can be done via additional system enhancements.

The authorization module and function supports role-based access control (RBAC) mechanism, where each user is assigned with one or more roles according to the business needs based on the least privileges concept (for example, standard or administrator roles).

Accounting module and function provides audit of security events such as authentication or login events.

The security module use rules to protect sensitive information, for example: that the data accessed is used for the specific purposes for which it was collected; that sensitive information is encrypted when in storage and transit, and masked/truncated on display and logs; and that the entire security system is deployed in the customer's intranet network (behind network/infrastructure measures), in an independent domain.

Secure Development Life Cycle (SDLC) ensures that security aspects are handled during the project's life cycle, such as security design, security testing, etc.

Service planning module 55 is typically used by CSP sales representative, enterprise, and/or technician, as part of selling engagement process with enterprise/SMB customers.

The module provides the ability to interact with catalogues, customer data, network and ordering system to provide online network service proposal for the enterprise customers with ability to quote update the proposal, validate the serviceability and network inventory and once done provide the service order for activation using the northbound interface.

Service planning module 55 is also used to define/build new services, both internal (core) services and services that are sold to the customer (consumer or business). The definition of the service includes the elements that comprise the service, such as VNFs and VNF instances, and the connectivity between the different elements. In case of a customer service, a new product will be offered in the product catalog.

Inter-network coordination module 13 coordinates communications between the NFV-based network 10 and connected NFV-based networks 10. Communications (such as information, data, messages, commands, instructions, etc.) sent by an entity of the native NFV-based network 10 to an entity of a connected (external) NFV-based network 10 is transferred via the local (native) inter-network coordination module 13. Typically, the communication also passes via the corresponding inter-network coordination module 13 of the connected (external) NFV-based network 10. Communications received by an entity of the native NFV-based network 10 from any entity of a connected (external) NFV-based network 10 are received via the local (native) inter-network coordination module 13.

Such communications include communications between a module of an NFV-O module 12 of one NFV-based network 10 to a module of an NFV-O module 12 of another NFV-based network 10. Such communications also include communications between a VNF instance 61 of one NFV-based network 10 to a VNF instances 61 of another NFV-based network 10. Such communications also include communications between a module of an NFV-O module 12 of one NFV-based network 10 to a VNF instances 61 of another NFV-based network 10 and vice-versa.

East/west APIs 56 includes the following main domains/activities interfaces: information source to big data repository; interacting with the physical network system (OSS).

This also includes hybrid network management supporting services that are composed of virtual and physical elements, such as a security service composed of virtual firewall and physical DDoS box. In case of hybrid service, the NFV-O decomposes the entire order, executes the virtual part of the order, and forwards the physical part of the order to OSS to fulfil (and report) the order.

Northbound APIs 57 provides Application programming interface (API) to the following external software packages: Business support system (BSS) for service order fulfillment, cancel and update activities, status notification, resource inventory view, etc., monitoring system, assurance system, service planning tool, administration tool for system view and configuration, and big data repository.

Southbound APIs 58 provides APIs for the following external software packages: CMS—service and VNFs lifecycle activities—receiving from the infrastructure status and monitoring information for upstream system and activities (e.g., assurance). SDN Controller (or other connectivity system) to configure inter and intra data center connectivity, and EMS to configure the VNF.

Figure 5:
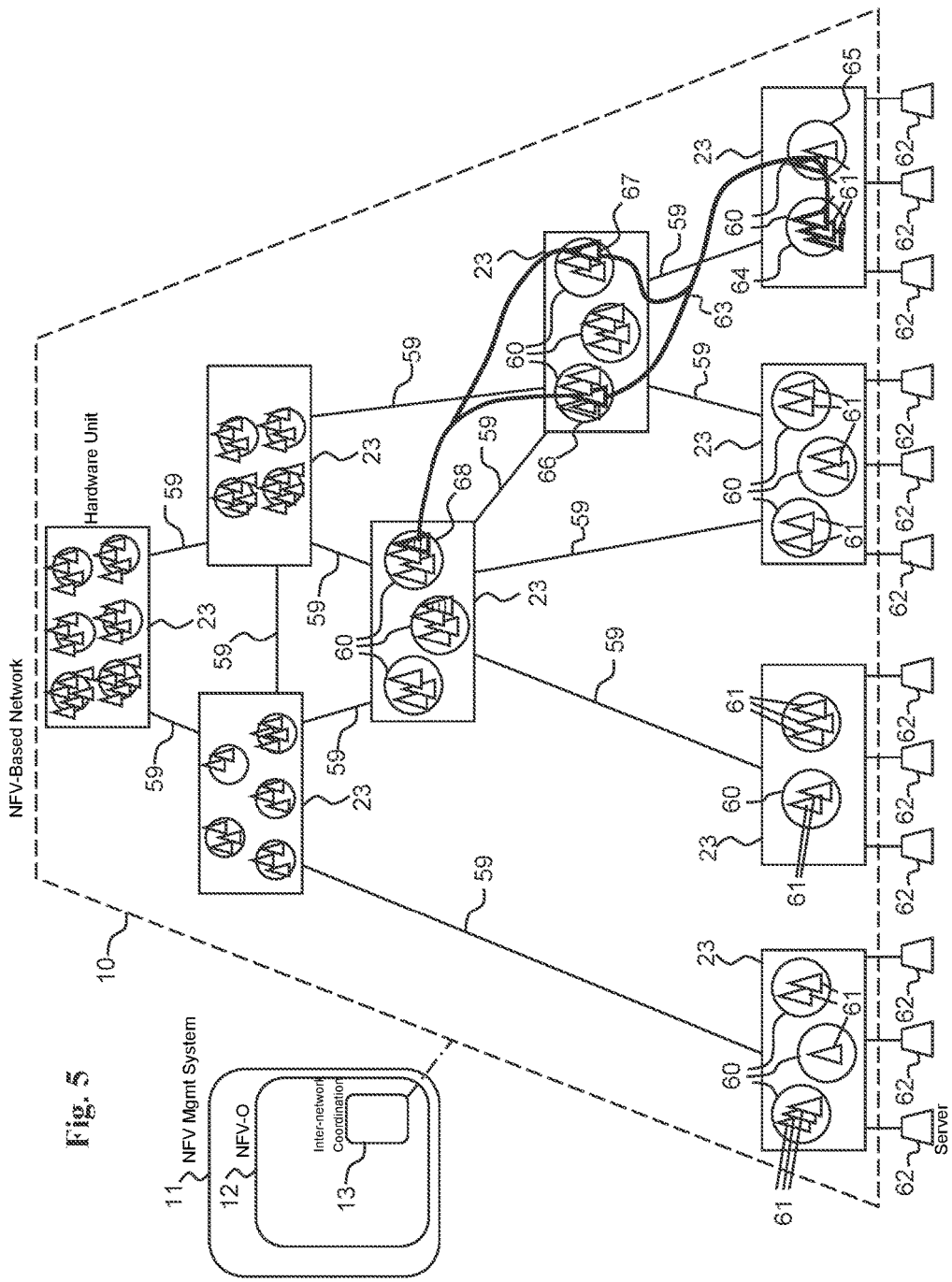
FIG. 5 is a simplified block diagram of services deployed in an NFV-based network, in accordance with one embodiment.

Reference is now made to FIG. 5, which is a simplified block diagram of a deployment of an NFV-based network 10, according to one embodiment.

As seen in FIG. 5, NFV-based network 10 includes hardware units 23 connected via transmission lines 59, and VNFs implemented as software programs 60 installed in hardware units 23. Some of hardware units 23 are directly connected to a customer. The customer may be a subscriber, an end-user, or an organization, represented herein as a terminal or a server 62 or a plurality of terminals and/or servers 62. NFV-based network 10 typically includes NFV management system 11, an NFV-orchestration (NFV-O) 12, and inter-network coordination module 13.

As seen in FIG. 5, several, typically different, VNFs 60 can be installed in the same hardware unit 23. Additionally, the same VNF 60 can be installed in different hardware units 23. A VNF 60 is typically executed by a processor of the hardware unit 23 in the form of a VNF instance 61. Therefore, a particular VNF 60 installed in a particular hardware unit 23 may be "incarnated" in (initiated, executed as) any number of VNF instances 61. Typically, the VNF instances 61 are independent of each other. Typically, each VNF instance 61 serves a different terminals and/or servers 62. NFV-based network 10 connects to and between communication terminal devices 62 typically operated by one or more customers, subscribers, and/or end-users.

It is appreciated that a network operator may manage one or more services deployed in the customer's premises. Therefore, some of the hardware units 23 may reside within the premises of the network operator while other hardware units 23 may reside in the customer's premises. Similarly, a server such as server computer 16 of FIG. 1, being a terminal devices 62 of FIG. 5, may reside in the premises of the network operator or in the customer's premises. Consequently, when the network operator provides and/or manages one or more services for a customer's terminal devices 62 such as server computer 16, the NFV-based network 10 of the network operator directly manages the VNFs 60 providing the services and their VNF instances 61. In such situation the NFV-based network 10 manages the services irrespectively of the location of the terminal devices 62 (e.g., server computer 16), whether in the premises of the network operator or in the customer's premises. In other words, the NFV-based network 10 may be managing VNFs 60 and VNF instances 61 providing the services, as well as the terminal devices 62 (e.g., server computer 16) being co-located within the same computing device (e.g., hardware unit 23), whether in the premises of the network operator or in the customer's premises.

A service provided by the communication network may be implemented using one or more VNFs. Otherwise put, a service is a group, or a chain of interconnected VNFs. The VNFs making the group, or the service, may be installed and executed by a single processor, by several processors on the same rack, within several racks in the same data-center, or by processors distributed within two or more data-centers. The present invention relates to optimizing the deployment of a service in a communication network using network function virtualization, and to optimizing the deployment of a group, or a chain, of virtual network functions (VNFs) in an NFV-based network. Therefore the term "chain optimization" refers to the planning and/or managing the deployment of VNFs making a chain, or a group, of VNF providing a particular service.

For example, FIG. 5 shows a first service 63, including VNFs 60 designated by numerals 64, 65, 66, 67, and 68, and their respective VNF instances 61 designated by a thick line. In this example the group or chain of the VNFs 60 making first service 63 are connected as a chain of VNFs 60. However, the VNFs 60 making a service can be connected in any conceivable form such as star, tree-root, tree-branch, mesh, etc., including combinations thereof. It is noted that a VNFs 60 may be executed by two or more VNF instances 61, such as VNF 64.

The deployment of the group or chain of the VNFs 60 making first service 63 is therefore limited by constraints such as the capacity of the communication link 59 bandwidth and/or latency (delay).

Typically, a VNF 60 has a list of requirements, or specifications, such as processing power, cash memory capacity, regular memory capacity (RAM, dynamic, or volatile memory), non-volatile memory (such as flash memory) capacity, storage capacity, power requirements, cooling requirements, etc. A particular VNF instance 61 providing a particular service (to a particular customer) may have further requirements, or modified requirements, for example associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for roll-back and/or recover, fault-tolerance, fail-safe operation, etc.

Typically, a service made of a chain or a group of VNF 60 and their VNF instances 61 has a similar list of requirements, or specifications, covering the service as a whole. Therefore, such requirements, or specifications, imply, affect, or include, requirements, or specifications, regarding communication links between VNFs 60 and/or VNF instances 61. Such requirements, or specifications, include bandwidth, latency, bit-error rate, packet loss, etc. Such communication requirements or specifications further impose deployment limitations, or constraints, requiring particular VNFs 60 and/or VNF instances 61 to reside in the same data-center, or within the same rack, or even in the same computing device, for example, sharing memory or executed by the same processor.

Security measures add further requirements, or specifications, such as co-location of some VNFs 60 and/or VNF instances 61.

NFV-based network 10 has a hierarchical structure. There are at least four aspects of the hierarchical structure of NFV-based network 10. The networking or traffic aspect refers to the arrangement of the transmission lines between hardware units 23. The processing aspect refers to the arrangement of the hardware units 23.

The software aspect refers to the arrangement of the VNFs 60. The operational aspect refers to the arrangement of the VNF instances 61.

An important aspect of the optimization process in an NFV-based network is that it is based on real-time needs, rather than long-term, statistically anticipated, needs. The only limitation on network reconfiguration in NFV-based network is that it does not result in a deterioration of any of the current services. NFV deployment module 43 enables, and manages, migration of services between hardware units 23, VNFs 60, and VNF instances 61 in real-time, without affecting the availability of a service, and while securing service and session continuity.

The term "continuous" here means that chain optimization module 44 performs the relevant task or process in run-time, or real-time, or online, or on-the-fly, or repetitively and without adversely affecting the network's functionality and its services.

Unlike a legacy network, the NFV-based network has two topologies: the topology of the hardware devices, and the topology of the VNFs (the distribution of VNFs among the hardware devices). The topology of the hardware network is relatively stable, while the VNF topology can be optimized in real-time. Another major benefit of the NFV-based network is that modifying the software topology (the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

It is therefore advantageous to localize NFV-O 12, and particularly the deployment optimization processes associated with deployment optimization module 43 and chain optimization module 44 to reduce the cost as discussed above, and simultaneously to secure the possibility to expand the scope of the network managed by these processes, if so needed.

Figure 6:
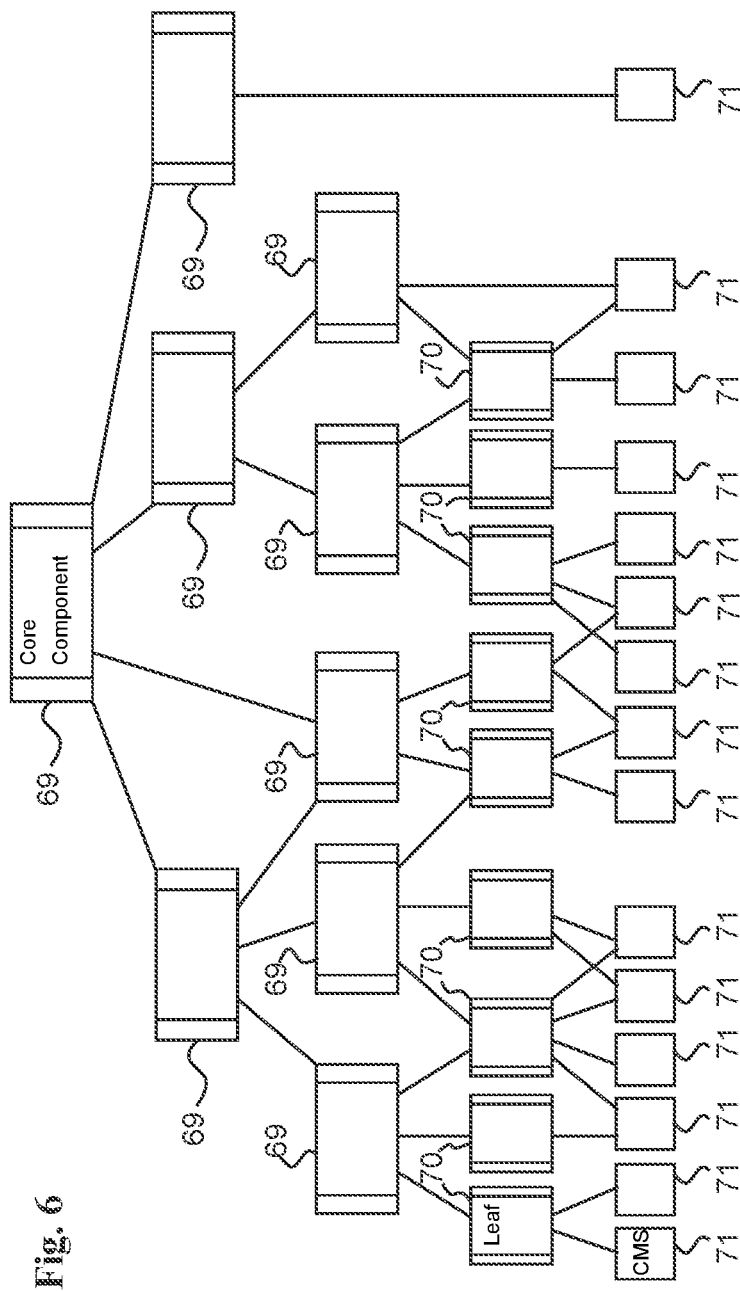
FIG. 6 is a simplified block diagram of a distributed deployment of an NFV-O, in accordance with one embodiment.

Reference is now made to FIG. 6, which is a simplified block diagram of a distributed deployment of NFV-O 12 according to one embodiment of the present invention.

The distributed architecture of NFV-O 12 enables faster response to local events on one hand, and improved scalability on the other hand. In a distributed NFV-O 12 architecture, decision processes are performed in self-contained and local decision points, closer to the customer, and closer to the events (such as network or security faults).

The hierarchy of a distributed NFV-O 12 can be viewed as a tree of two component types: core component 69 and leaf component 70. NFV-O core component 69 can be a child of another core component 69, and/or a parent of one or more core components 69 or leaf components 70. A leaf component 70 cannot be a parent of a core component 69 or a leaf component 70.

Orchestration parameters managed by a particular leaf component 70 or core component 69 are reported in real-time to the supervising (parent) core component 69. In addition to the supervision, this continuous updating process enables the supervising component to provide backup, and/or support recovery processes associated with hardware and/or software faults as well as security faults and/or breeches.

To provide redundancy a leaf component 70 may be supervised by two or more core components 69, and child core components 69 may be supervised by two or more parent core components 69. The orchestration parameters managed by a particular core components 69 or leaf component 70 are also mirrored to the backup core components 69. Optionally, NFV-O Core components 69 have the same fully functional orchestration capabilities while leaf components are limited to simple, well defined and localized sub-orchestration tasks, and thus may provide a faster response to demands and changing load.

A cloud management system (CMS) 71 is a software package managing one or more hardware units 23 operating one or more VNFs 60 and executing one or more VNF instances 61. A CMS 71 can be managed by one or more leaf components 70 or core components 69, or combinations thereof. A CMS 71 can be located in the operator's premises or in the customer's premises or partly in both.

An NFV-O component such as a core components 69 or a leaf component 70 typically orchestrates a particular, predefined, territory. The territory may be one or more cloud management systems 71, one or more services, one or more customers, etc. Therefore, there can be an overlap between territories of different NFV-O components. For example, one NFV-O component orchestrates a CMS 71, another NFV-O component orchestrates a service that is at least partly provided the same CMS 71, and additionally a third NFV-O component orchestrates services for a particular customer connected to that same CMS 71.

If, for any reason, the first responder NFV-O component cannot resolve the problem, for example for lack of adequate or sufficient resources within the territory of the particular NFV-O component, the problem is escalated above to the supervising or parent NFV-O component.

The NFV-O is a central component of the network as a system and as such presents a major risk. An attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance is isolated and its functionality is transferred to one or more other NFV-O instances.

Another aspect of NFV-O hierarchy is stratified granularity, or resolution, of the orchestration process. An NFV-based network 10 may include a very large number of hardware elements (processors, memory units, storage units, communication links, etc.) and an even larger number of VNFs 60 and VNF-instances 61. Each of the VNF-instances 61 have a number of requirements (such as processing power, memory size, storage size, communication bandwidth, latency and jitter, etc.). Each of these hardware elements and software modules produce a number of load values (typically corresponding to their respective requirements).

All this creates a large amount of data that should be processed continuously or repeatedly to determine possible adverse conditions (e.g., a particular overload) or a potential cost saving situation. Such situation may require deployment optimization (e.g., the planning of a newly optimized deployment of VNF-instances 61) and redeployment (implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 70 manages its part (territory) of the NFV-based network 10 in terms of particular hardware elements (e.g., processors, memory units, storage units, communication links, etc.) and software elements (e.g., VNFs 60 and VNF-instances 61) a core component 69 may manage its part (territory) of the NFV-based network 10 in terms of whole subordinate (child) core components 69 or leaf components 70 it supervises. Thus, such parent core component 69 performs deployment optimization in terms of requirements and load values applied to whole subordinate (child) core components 69 or leaf components 70.

A customer may use the services of several telecom operators. For example, an international company operating in several countries. Such a customer usually establish a virtual private network (VPN) across this plurality of telecom operators. Considering that these operators now operate NFV-based networks, the customer may establish a service including a plurality of VNFs where different VNFs are part of different networks. Managing such inter-operator VNF-chain, or service, requires tight coordination across different NFV-based networks. Such coordination can be implemented using the following methods: enabling tight coordination between NFV-Os of the different NFV-based networks; and establishing an inter-network NFV-O module that manages one or more inter-network VNF-chains, or services of a particular customer.

Optionally, and perhaps preferably, such inter-network NFV-O supervises two or more child or leaf NFV-O modules, each within a particular NFV-based network incorporating an NFV participating in the particular VNF-chain or service.

It is appreciated that NFV-Os of different operators may be provided by different NFV-O vendors.

Figure 7:
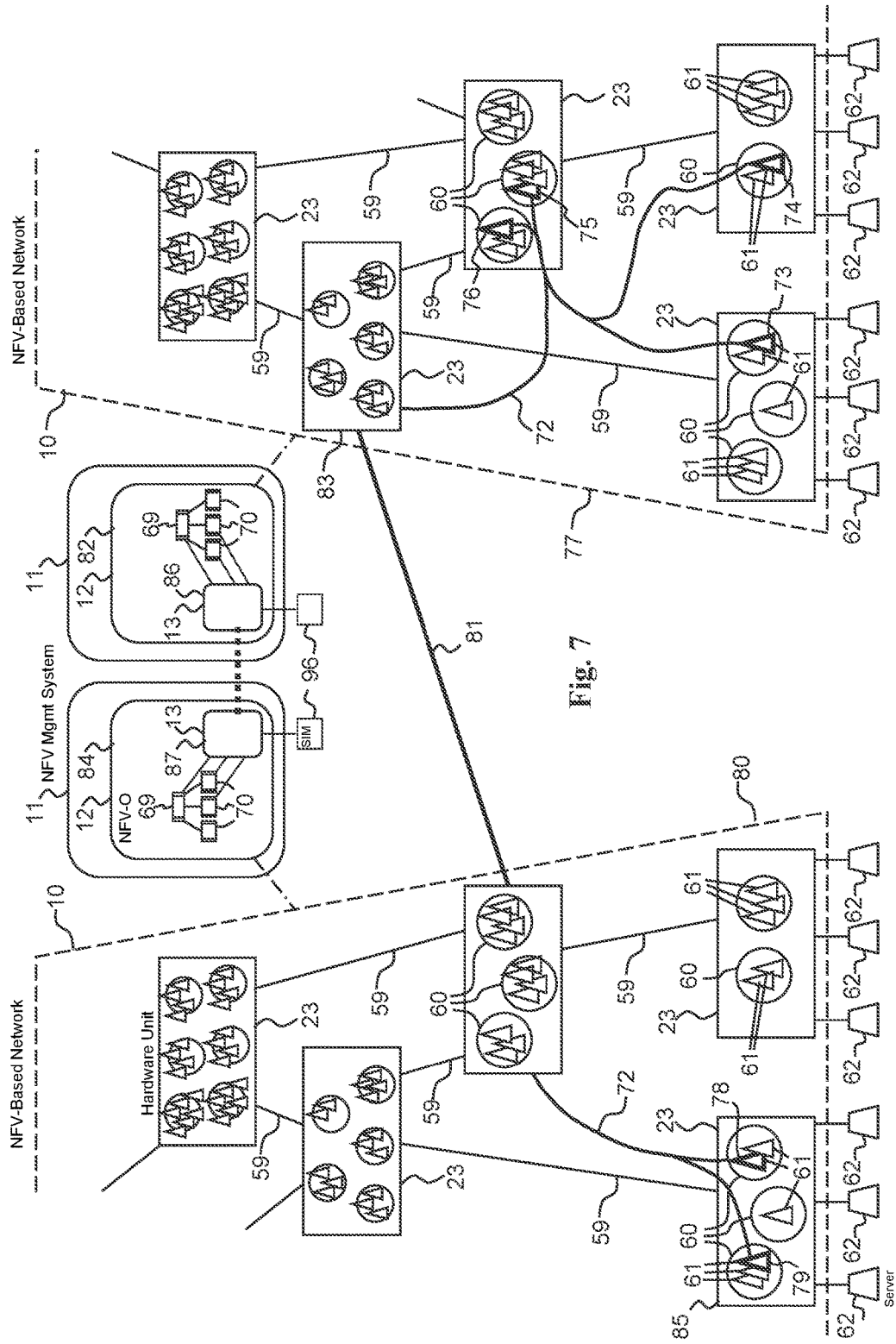
FIG. 7 is a simplified block diagram of a service spanning two NFV-based networks, in accordance with one embodiment.

Reference is now made to FIG. 7, which is a simplified block diagram of a service 72 spanning two NFV-based networks 10, according to one embodiment.

As seen in FIG. 7, service 72 may include VNF instances 61 designated by numerals 73, 74, 75, and 76, operating in a first NFV-based network 10 designated by numeral 77, and VNF instances 61 designated by numerals 78, and 79, operating in a second NFV-based network 10 designated by numeral 80. NFV-based networks 77 and 80 are communicatively coupled via communication link 81. It is appreciated that FIG. 7 shows only respective parts of NFV-based networks 77 and 80.

NFV-based networks may have their respective NFV management system 11, NFV-O 12, and inter-network coordination module 13. As seen in FIG. 7, the NFV-Os 12 of NFV-based networks 77 and 80 are typically hierarchical, including one or more core components 69 and/or leaf components 70. NFV management system 11 NFV-O 12, core components 69, leaf components 70, and inter-network coordination module 13 may reside and be executed by one or more hardware units 23 of their respective NFV-based network 10. The inter-network coordination modules 13 are typically communicatively coupled via communication link 81.

There may be various reasons for deploying service 72 in the manner described in FIG. 7. For example, to provide faster response time, VNFs 73, 74, 78 and 79 should be as close as possible to their respective terminal devices 62. Another reason may be to reduce the long range traffic (bandwidth) of service 72 via communication link 81. For any such reason a service may be deployed over two or more networks belonging or operated by different network operators.

In the current example, NFV-O 12, designated by numeral 82, operative in NFV-based networks 77, (or core components 69, or leaf component 70 thereof) detects a load increase in hardware unit 23, designated by numeral 83. Therefore, NFV-O 82, or its deployment optimization module 43, or its chain optimization module 44, prepares a new deployment plan. This new deployment plan requires an additional VNF instance close to the respective terminals in NFV-based network 80. This additional VNF instance is to be VNF instance 79.

To implement the planned deployment, NFV-O 82 has to communicate with NFV-O 12, designated by numeral 84, operative in NFV-based network 80, (or core components 69, or leaf component 70 thereof), which supervises the appropriate hardware unit 23, such as hardware unit 23 designated by numeral 85, where VNF instance 79 is to be deployed.

It is appreciated that NFV-O 82 is outside the NFV-O hierarchy of NFV-O 84. Thus, NFV-O 82 has no means to locate the particular NFV-O 84 (e.g., core components 69, or leaf component 70) that supervises hardware unit 85. Furthermore, NFV-O 84 has no means to authenticate the communication from NFV-O 82, and/or the authorization of NFV-O 82 to request or instruct any action of NFV-O 84. Therefore, NFV-O 82 communicates with NFV-O 84 via their respective inter-network coordination module 13, designated by numerals 86 and 87.

Figure 8:
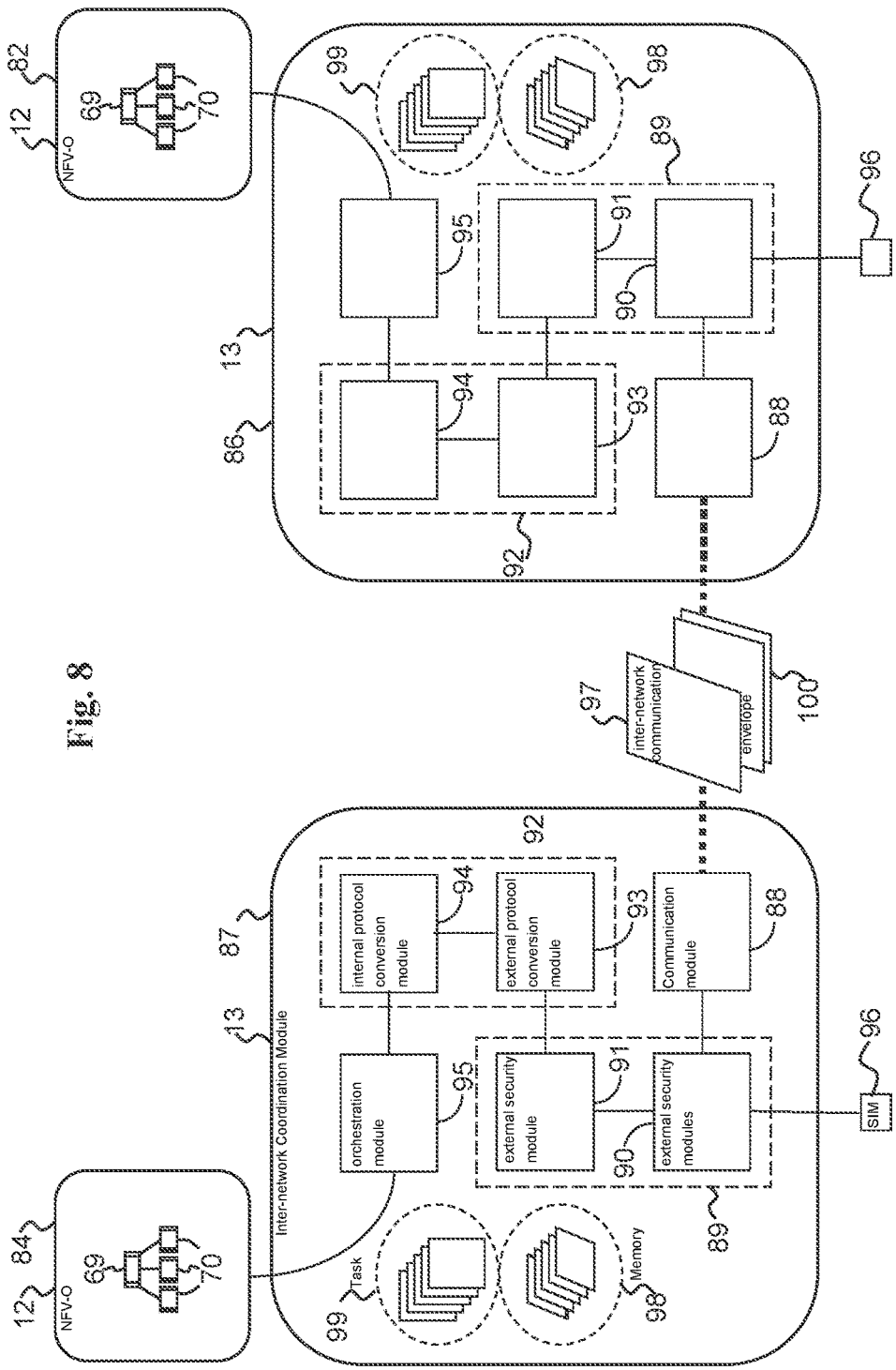
FIG. 8 is a simplified block diagram of two inter-network coordination modules connecting two NFV-based networks, in accordance with one embodiment.

Reference is now made to FIG. 8, which is a simplified block diagram of inter-network coordination modules 86 and 87, according to one embodiment.

As seen in FIG. 8, each inter-network coordination module 13 may include any of the following components: a communication module 88, adaptive to communicate with the communication module 88 of the other inter-network coordination module 13; a security module 89, which may include an external security module 90, and an internal security module 91; a protocol conversion module 92, which may include an external protocol conversion module 93, and an internal protocol conversion module 94; and an orchestration module 95 adaptive to communicate within the respective NFV-O 12 hierarchy. As an example, orchestration module 95 may appear in its respective NFV-O 12 hierarchy as an NFV-O component such as a core component or a leaf component.

It is appreciated that the connectivity order of the modules as described in FIG. 8 is arbitrary, particularly with respect to the order of the 'internal' and 'external' modules. Alternatively or additionally, some or all of the modules may be connected to a bus configuration, or in a star configuration, or any other configuration, or a combination thereof.

External security module 90 and external protocol conversion module 93, may be provided by the external, or foreign NFV-based network 10. For example, external security module 90 and external protocol conversion module 93 embedded in inter-network coordination module 86 are provided by NFV-based network 80 (of FIG. 7), while external security module 90 and external protocol conversion module 93 embedded in inter-network coordination module 87 are provided by NFV-based network 77 (of FIG. 7).

External protocol conversion module 93 and external security module 90 may be provided as software programs (e.g., software development kits, or SDK). However, alternatively or additionally, external protocol conversion module 93 and external security module 90 may be provided, entirely or partly, as one or more hardware devices. For example, external security module 90 may be provided at least partly in the form of a smart-card or a subscriber identification module (SIM) 96.

Inter-network coordination module 86 uses external security module 90 to process security functions associated with the corresponding inter-network coordination module 87 (and vice versa). For example, external security module 90 enables inter-network coordination module 86 to decrypt communications received from inter-network coordination module 87, to identify and authenticate the sender (e.g., a or leaf component 70), and to verify the sender's authorization with respect to the received request or instruction, and vice versa.

Inter-network coordination module 86 may use external protocol conversion module 93 to interpret inter-network communication 97 received from inter-network coordination module 87, and vice versa.

It is appreciated that a particular inter-network coordination module 86 may include a plurality of external security module 90 and/or external protocol conversion module 93, (or a plurality of security module 89 and/or protocol conversion module 92) for communicating with a respective plurality of external, or foreign NFV-based networks 10. Alternatively, an NFV-based network 10 may have a plurality of inter-network coordination modules 86, each communicating with a single external, or foreign NFV-based network 10.

An inter-network coordination module 13 may process concurrently a plurality of communications 97. For example, a plurality of entities of NFV-based network 77 may concurrently communicate with a plurality of entities of NFV-based network 80. Such entities may be NFV-Os 12, VNF instances 61, etc. Any number of entities of a first NFV-based network 10 may communicate with any number of entities of a second NFV-based network 10 at the same time.

Inter-network coordination modules 13 of both NFV-based networks 10 may keep track of the communications 97, associate each of the communications 97 with the correct network entity, verify and authenticate each of the communications 97, and forward each of the communications 97 to the correct network entity. Performing such duties may require a memory, or a record, of each inter-network communication process. Each inter-network communication process (or memory or record thereof) may therefore be associated with the entities involved, as well as with the communications 97. An inter-network communication process may involve one or more communications 97 exchanged between two or more entities of different NFV-based networks 10. An inter-network communication process is therefore a sequence, or a thread, of communications 97.

A memory or record (e.g., memory stack and state) of an inter-network communication process may be provided by each inter-network coordination module 13 using any of the following methods.

For example, this may include a memory structure 98 for each communication process, within inter-network coordination modules 13 (or communicatively coupled to inter-network coordination modules 13). Memory structure 98 is properly associated with the communication process and the entities involved. Typically, communication module 88 (for incoming communications 97) and orchestration module 95 (for outgoing communications 97) associate a communications 97 with the correct memory structure 98.

This may also include a task (a processing instance) 99 for each inter-network communication process, each task 99 having its own memory (which may be memory structure 98). Task 99 typically executes at least some of the modules of network coordination module 13 (independently for each inter-network communication process). Typically, communication module 88 (for incoming communications 97) and orchestration module 95 (for outgoing communications 97) associate a communications 97 with the correct task 99. Such task 99 may take the form of a VNF instance 61.

This may also include an envelope or appendix communication item 100, embedded or included with inter-network communication 97, including the above mentioned memory or records, as seen in FIG. 8. An inter-network communication 97 may carry any number of appendix items (memory records) 100, issued by the same or by different inter-network coordination modules 13.

It is appreciated that these methods are not mutually exclusive. For example, inter-network coordination modules 13 may activate a task 99 for each inter-network communication process ongoing between a particular plurality of network entities of both NFV-based networks 10. Each such task 99 may have some of the memory of the inter-network communication process stored internally (or, alternatively, as memory structure 99), and some of the memory of the inter-network communication process stored and handled as one or more appendix items 100. For example, to enable communication module 88 to identify the task associated with the received inter-network communications 97.

Reference is now made to FIG. 9, which is a simplified flow chart of a process 101 for receiving an inter-network communication 97, according to one embodiment.

Process 101 is typically executed by a first inter-network coordination module 13, for receiving an inter-network communication 97 from a corresponding, second, inter-network coordination module 13.

As seen in FIG. 9, process 101 typically starts in step 102 by receiving an inter-network communication 97 from a corresponding, second, inter-network coordination module 13, this step is typically executed by communication module 88.

Process 101 then typically proceeds to step 103 to decrypt, identify and authenticate the received inter-network communication 97, typically using external security module 90 and internal security module 91. For example, internal security module 91 verifies that inter-network communication 97 is correctly authenticated and encrypted by the corresponding external security module 90 used by the second NFV-based networks 10. It is appreciated that the external security module 90 used by the second NFV-based network 10 is provided by the receiving NFV-based network 10.

Therefore, for example, the inter-network coordination module 13 of the sending (second) NFV-based network 10 may use the external security module 90 provided by the receiving (first) NFV-based network 10 to encrypt and authenticate the inter-network communication 97. Thereafter, the inter-network coordination module 13 of the receiving (first) NFV-based network 10 may use its internal security module 91 to decrypt and authenticate the received inter-network communication 97. Similarly, if the sending (second) NFV-based network 10 has used its internal security module 91 to encrypt and authenticate the inter-network communication 97, the receiving (first) NFV-based network 10 may use the external security module 90 (provided by the sending (second) NFV-based network 10) to decrypt and authenticate the received inter-network communication 97.

It is appreciated that the inter-network coordination modules 13 of the corresponding NFV-based networks 10 may use both external security module 90 and internal security module 91 to encrypt, decrypt and authenticate the inter-network communication 97. For example, the inter-network coordination modules 13 of the sending NFV-based network 10 may use the internal security module 91 to encrypt and authenticate the inter-network communication 97 and then use the external security module 90 to further encrypt and authenticate the inter-network communication 97. The inter-network coordination modules 13 of the receiving NFV-based network 10 may then use the internal security module 91 to decrypt and authenticate the inter-network communication 97 as encrypted by the external security module 90 used by the sending NFV-based network 10, and then use the external security module 90 provided by the sending network to further decrypt and authenticate the inter-network communication 97. Process 101 then typically proceeds to step 104 to convert the received inter-network communication 97 into the native protocol, typically using external protocol conversion module 93, and an internal protocol conversion module 94. It is appreciated that the external protocol conversion module 93 used by the receiving NFV-based network 10 is provided by the sending NFV-based network 10.

Process 101 then typically proceeds to step 105 to investigate the memory stack and state associated with the received communication module 88, if any exists. For example, process 101 investigates the appendix items 100 embedded with the inter-network communication 97 (if any exist). Process 101 looks for one or more appendix items 100 it has created and investigate them, for example, for information identifying the entity addressed by the received inter-network communication 97 (step 106). Alternatively or additionally, process 101, typically operating as a part of a task 99, may investigate the task's internal memory and/or the associated memory structures 98.

Process 101 then typically proceeds to step 107 to authenticate and encrypt the converted inter-network communication 97, and to send it (step 108), typically by using orchestration module 95, to the addressed entity within its own NFV-based network 10. Such entity may be an NFV-O 12, a VNF instance 61, or any other entity of the receiving NFV-based network 10. Step 107 may use, for encryption and authentication, native security measures as used within the particular (e.g., receiving, first) NFV-based network 10, such as for communicating between NFV-O modules and/or VNF instances.

In steps 107 and 108 process 101 adapts the structure and contents of inter-network communication 97 according to the requirements of the internal protocol used by the receiving NFV-based network 10. It is appreciated that the authentication and encryption, as well as other actions and provisions, are required by the receiving NFV-based network 10 for treating internal communications between entities of the NFV-based network 10. The addressed entity (of the receiving NFV-based network 10) now receives the reformatted contents of inter-network communication 97 as a common, standard, communication from a recognizable entity of its own NFV-based network 10.

Reference is now made to FIG. 10, which is a simplified flow chart of a process 109 for sending an inter-network communication 97, according to one embodiment.

Process 109 is typically executed by a first inter-network coordination module 13, for sending an inter-network communication 97 to a corresponding, second, inter-network coordination module 13.

Process 109 typically starts with step 110, by receiving an internal communication from a local entity of its NFV-based network 10. Such entity may be an NFV-O 12, an NFV-O component, an NFV-O module, a VNF instance 61, a service such as a network service, a group or a chain of VNFs, etc. The internal communication indicates a request or instruction associated with a resource of a corresponding (second) NFV-based network 10. In the example described with reference to FIG. 7, the entity sending the internal communication is an NFV-O 12 of NFV-based networks 77 requesting the instantiation of a VNF instance 61 that can serve a particular customer (VNF instance 79 of FIG. 7).

Process 109 typically proceeds with step 111, to decrypt and authenticate the internal communication received from the local entity and derive the details of the request included in the internal communication. Step 111 may use, for encryption and authentication, native security measures as used within the particular NFV-based network 10 (e.g., sending, second), such as for communicating between NFV-O modules and/or VNF instances.

If the received internal communication initiates a new inter-network communication process (as determined in step 112), process 109 typically creates a first-time inter-network communication 97 and its memory stack and state. Optionally, as seen in FIG. 10, process 109 initiates a task 99 and/or a memory structure 98 (step 113). If a task 99 is initiated, at least a part of the current process 109 may be executed by this task 99. Process 109 then initiates also the memory stack and state of the new inter-network communication process (step 114).

If the received internal communication continues an existing inter-network communication process, process 109 updates the memory stack and state (step 115) for example, by updating or adding a memory structure 98 and/or an appendix item 100.

Process 109 then typically proceeds to step 116 to format a new inter-network communication 97 compliant with the received internal communication. It is appreciated that there may be differences between the formats and/or protocols used for communication within each network (internal communication), and the formats and/or protocols used for communication between networks (inter-network communication).

Process 109 then proceeds to step 117 to secure the inter-network communication 97, typically by using the security module 89. As part of step 117, process 109 may use extemrnal security module 90 to authenticate and encrypt inter-network communication 97 in a manner compatible with the security and authentication requirements of the other (corresponding) inter-network coordination module 13 (such as described, for example, with reference to step 103 of process 101 and FIG. 9).

Process 109 then proceeds to step 118 to send the inter-network communication 97 and the associated appendix items 100 (if needed) to the corresponding inter-network coordination module 13.

It is appreciated that the first time a request for a resource (or for resource control) is received by the receiving inter-network coordination modules 13 (e.g., by process 101) the particular addressed entity is unknown. Therefore, the receiving inter-network coordination modules 13 has to locate the appropriate entity that can fulfil the demand by the entity of the other NFV-based network 10. This procedure is typical in the NFV-based network 10.

For example, if a first leaf component 70 requires an additional resource (or control over a resource external to its territory) the first leaf component 70 applies to its parent (core) component 69. This request of the first leaf component 70 travels up the NFV-O hierarchy until a core component 69 having control of the appropriate resource is reached. At this point the request travels down the NFV-O hierarchy until it reaches the NFV-O 12 module (typically a second leaf component 70) that directly controls the appropriate resource (or can directly instantiate it).

Similarly, when an inter-network coordination modules 13 (e.g., process 101) receives a first-time inter-network communication 97, it sends the resulting internal communication up the NFV-O hierarchy and waits for a response indicating the appropriate entity to take care of the request communicated in the received inter-network communication 97.

Thereafter, the identity of this network entity is known to the inter-network coordination modules 13 (e.g., process 101, or a particular task 99 thereof) and recorded, for example, in appendix item 100 embedded in (or appended with) the inter-network communications 97 going back and forth between the inter-network coordination modules 13 of the two NFV-based networks 10.

It is appreciated that the appropriate entity (of the local NFV-based networks 10) may be any of NFV-O 12, core component 69, leaf component 70, a VNF-instance 61, etc. It is also appreciated that the appropriate entity may first be an NFV-O 12 (or a core component 69, or a leaf component 70), and then be a VNF-instance 61, after it has been instantiated by the NFV-O 12. There may be a plurality of 'appropriate entities', for example, a plurality of VNF-instances 61.

The description associated with FIGS. 8, 7, 9, and 10 provides a method for managing a service spanning a plurality of VNF-based networks 10, or an inter-network service, or an inter-network chain of VNF instances 61 (inter-network VNF chain), or an inter-network service. This method involves the following issues: network security, protecting a first NFV-based network 10 from attacks by a malicious software operating from the premises of a second NFV-based network 10; network security, protecting a first NFV-based network 10, and particularly the NFV-O system of the first network, from within the inter-network VNF chain; customer security, protecting the VNF-chain within a first network from attacks by a malicious software operating from the premises of a second network, and attacking, for example, VNFs in the first network that are part of the same VNF-chain, or service; authentication, authorization and encryption for communications between VNF instances and NFV-O modules of the various NFV-based networks, on a per customer level; protocol compatibility between VNFs of different NFV-based networks; protocol compatibility between NFV-Os of different hierarchies; and protocol compatibility between NFV-Os of different NFV-O vendors.

As disclosed above with reference to the example of FIGS. 7, 8, 9, and 10, the security-related feature described above are typically provided by the inter-network coordination module 13 acting as a buffering and isolation mechanism between the two NFV-based networks 10.

It is further appreciated that the buffering and isolation mechanism between the two NFV-based networks 10 includes a dual inter-network coordination module 13 system. The dual inter-network coordination module 13 system enables transparency of the buffering and isolation mechanism. Thus, the modules and processes (e.g., NFV-Os 12 and VNFs 60) internal to each NFV-based networks 10 are protected from each other in a transparent manner. Modules and processes of one NFV-based network 10 are to exposed to, or aware of, the security measures of the inter-network communication. Particularly, modules and processes of one NFV-based network 10 are to exposed to, or aware of, the security measures of the other NFV-based network 10.

It is also appreciated that the security mechanism as disclosed above makes use of security module 89. Particularly, the security mechanism use external security module 90 and its functionality. Furthermore, relating to the integration between the internal and external security modules (90 and 91) within each inter-network coordination modules 13 to provide buffering, isolation and transparency.

Further noted, with respect to security, buffering, isolation and transparency, is the use of the memory stack and state for each inter-network communication process, within and/or between the inter-network coordination modules 13 of each of the communicating NFV-based networks 10 in the various manners disclosed above.

As disclosed above with reference to the example of FIGS. 7, 8, 9, and 10, the compatibility-related feature described above are typically provided by the inter-network coordination module 13 acting as a buffering and protocol conversion mechanism between the two NFV-based networks 10.

Inter-network compatibility issues refer to authentication, authorization, and protocol compatibility between NFV-Os, VNFs and VNF instances of the different NFV-based networks. These issues are treated by the protocol conversion module 92 within the inter-network coordination module 13 of each NFV-based networks 10, particularly, by the external protocol conversion module 93, and by the integration between the internal and the external protocol conversion modules 94 and 93.

Compatibility and transparency are further provided using memory stack and state for each inter-network communication process, within and/or between the inter-network coordination modules 13 of each of the communicating NFV-based networks 10 in the various manners disclosed above.

Managing Inter-Operator VNF-Chains also involves issues such as: VNF migration, service continuity, software and hardware deployment optimization, preventive maintenance and fault recovery, integrating with the environment (e.g., cloud-based services), etc.

One method for a first NFV-based network 10 to provide a resource to a second NFV-based network 10 is to physically disconnect the resource from the first NFV-based network 10. This means that the resource is dedicated to the second NFV-based network 10 exclusively, limiting the possibilities to optimize any of the NFV-based networks 10.

Another method for a first NFV-based network 10 to provide a resource to a second NFV-based network 10 is to create some kind of flexible exclusive use of local processing infrastructure. The NFV-O of the first NFV-based network 10 clears the (exclusive) processing infrastructure and hands it over to the second NFV-based network 10. The second NFV-based network 10 may request a resource, or surrender the resource, or parts thereof.

Figure 11:
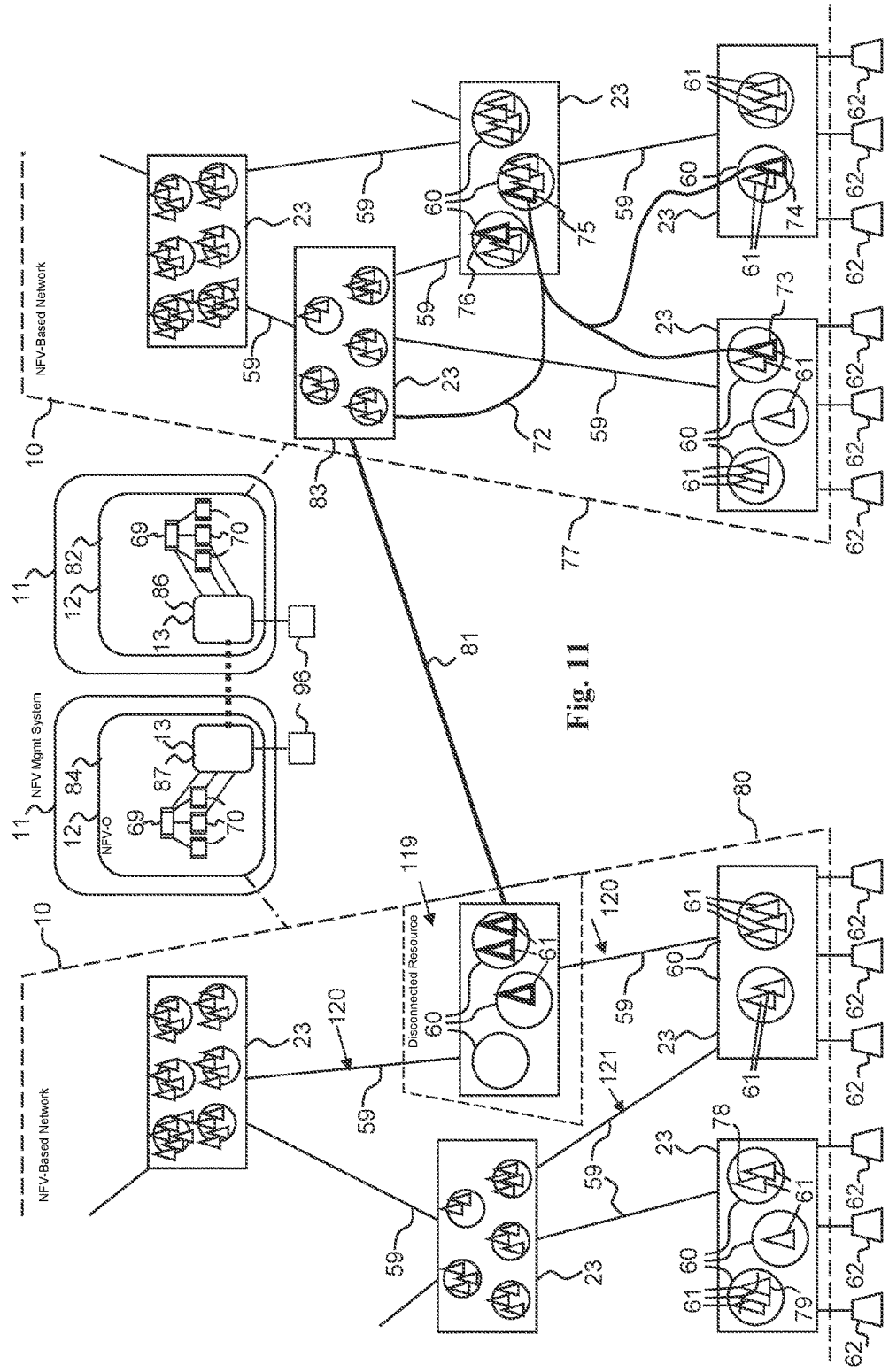
FIG. 11 is a simplified illustration a first NFV-based network providing a disconnected resource to a second NFV-based network, in accordance with one embodiment.

Reference is now made to FIG. 11, which is a simplified illustration a first NFV-based network 10 providing a disconnected resource to a second NFV-based network 10, according to one embodiment.

As seen in FIG. 11, NFV-based network 10 designated by numeral 80 provides a disconnected resource 119 to NFV-based network 10 designated by numeral 77. It is appreciated that NFV-based network 77 is directly connected to resource 119, and that resource 119 can be disconnected from NFV-based network 80 (at communication links 59 designated by numeral 120) without degrading the services provided by NFV-based network 80. For example, hardware unit 23 and the terminal devices 62 it serves are still connected to NFV-based network 80 via communication link 59 designated by numeral 121. It is appreciated that communication links 120 do not have to be physically disconnected.

It is also appreciated that resource 119 is now placed under the control of NFV-O 82 of NFV-based network 77 (or a core component 69 or a leaf component 70 thereof).

NFV-O 82 (or a core component 69 or a leaf component 70 thereof) installs VNFs 60, and activates VNF instances 61, associated with resource 119.

Yet another method for a first NFV-based network 10 to provide a resource to a second NFV-based network 10 is to hand over a "loaded" exclusive (or secluded) processing infrastructure. The processing infrastructure is loaded with at least a local NFV-O and possibly VNFs too. The use of local NFV-O possibly resolves issues of (communication) compatibility.

Figure 12:
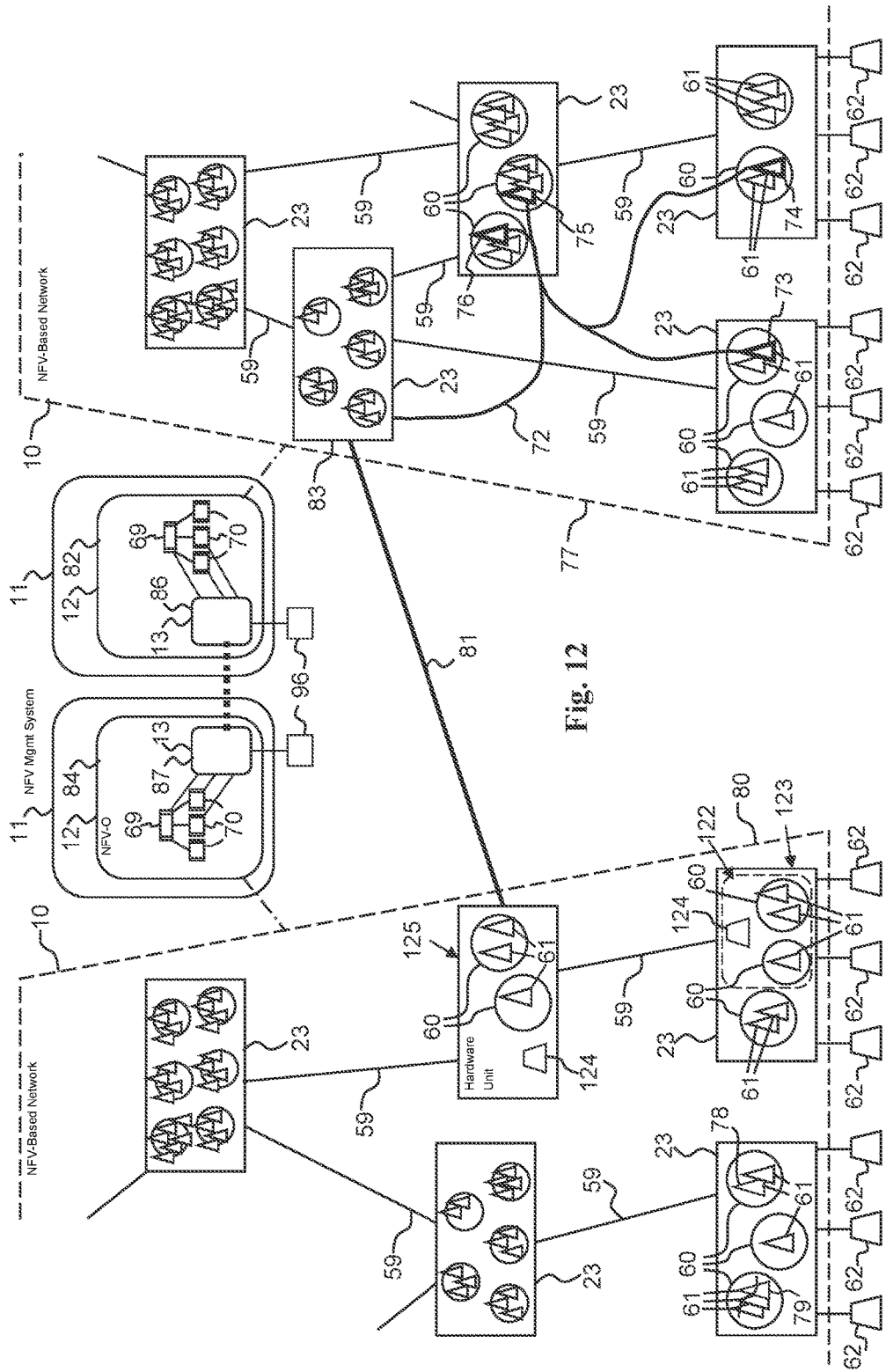
FIG. 12 is a simplified illustration a first NFV-based network providing a loaded resource to a second NFV-based network, in accordance with one embodiment.

Reference is now made to FIG. 12, which is a simplified illustration a first NFV-based network 10 providing a loaded resource 122 to a second NFV-based network 10, according to one embodiment.

As seen in FIG. 12, loaded resource 122 is typically a part of a large scale hardware unit 23. NFV-based network 80 may prefer providing the resource as a loaded resource rather than a disconnected resource because both NFV-based networks have to provide services to terminal devices 62 connected to hardware unit 23 designated by numeral 123. Therefore, NFV-based network 80 cannot relinquish control of hardware unit 123 in its entirety. NFV-based network 80 also prefers to minimize its involvement in the management of resource 122, and therefore NFV-based network 80 provides resource 122 with a dedicated NFV-O designated by numeral 124.

NFV-O 84 of NFV-based network 80 therefore instructs its inter-network coordination module 87 that one or more particular inter-network communication processes are supervised by NFV-O 124. NFV-O 82 of NFV-based network 77 can now control resource 122 using NFV-O 124, for example as a leaf component 70. NFV-O 82 communicates with NFV-O 124 by using, for example, the method disclosed above with reference to FIGS. 8, 7, 9, and 10.

It is appreciated that NFV-O 124 may reside in hardware unit 123 or in another hardware unit 23, such as hardware unit 23 designated by numeral 125.

Still another method for a first NFV-based network 10 to provide a resource to a second NFV-based network 10 is to coordinate between NFV-Os, and particularly between root NFV-Os of the two (or more) networks. Such a method is disclosed above with reference to FIGS. 8, 7, 9, and 10. This method provides the following inter-network processes: exchanging optimization requirements and deployment plans (both software and hardware); managing security, authentication and authorization across the networks borders and in overlapping areas; and managing migration of VNFs (and VNF instances) across networks borders and in overlapping areas.

It is appreciated that certain features of the invention, which are described in the context of different embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

Figure 13:
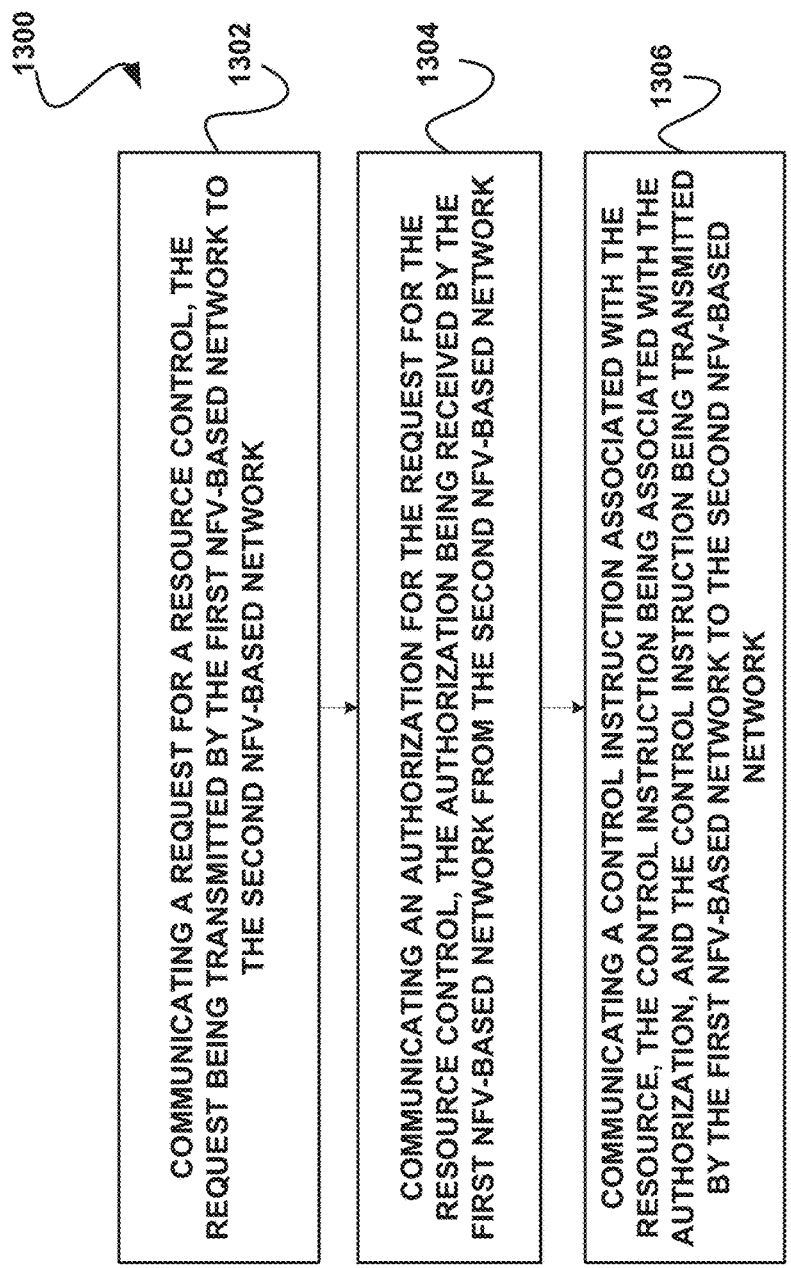
FIG. 13 illustrates a method for coordinating a plurality of networks based on network function virtualization, in accordance with one possible embodiment.

FIG. 13 shows a method 1300 for coordinating a plurality of networks based on network function virtualization (NFV), in accordance with one embodiment. As an option, the method 1300 may be implemented in the context of the details of the previous figures and/or any subsequent figure(s). Of course, however, the method 1300 may be implemented in the context of any desired environment. Further, the aforementioned definitions may equally apply to the description below.

The method 1300 includes controlling, by a first network function virtualization based communication network (NFV-based network), a resource provided by a second NFV-based network, which includes: communicating a request for a resource control, the request being transmitted by the first NFV-based network to the second NFV-based network (see operation 1302); communicating an authorization for the request for the resource control, the authorization being received by the first NFV-based network from the second NFV-based network (see operation 1304); and communicating a control instruction associated with the resource, the control instruction being associated with the authorization, and the control instruction being transmitted by the first NFV-based network to the second NFV-based network (see operation 1306).

In one embodiment, at least one of the communicating the request for the resource control and communicating the authorization for the request for the resource control may be executed by an orchestration module of at least one of the first NFV-based network and the second NFV-based network.

In another embodiment, at least one of the communicating the request for the resource control and the communicating the authorization for the request for the resource control may be executed using at least one of: a first coordination module of the first NFV-based network, the first coordination module being authorized by the second NFV-based network; and a second coordination module of the second NFV-based network, the second coordination module being authorized by the first NFV-based network.

In yet another embodiment, the first coordination module may be coupled to an authentication device provided by the second NFV-based network; and the second coordination module may be coupled to an authentication device provided by the first NFV-based network. In this case, the authentication device may be at least one of a smartcard and a subscriber identification module (SIM).

Still yet, in one embodiment, the method 1300 may include at least one of: allocating an NFV orchestration instance, by the first NFV-based network, the NFV orchestration instance operative to perform at least one of: communicating to the second NFV-based network the request for a resource control; and controlling resources of the second NFV-based network; or allocating an NFV orchestration instance, by the second NFV-based network, the NFV orchestration instance operative to perform at least one of: receiving, from the second NFV-based network, the request for a resource control; and allocating resources of the second NFV-based network to the first NFV-based network.

It should be noted that the resource may include one or more of processing power, memory, storage, communication bandwidth, and a virtual network function (VNF), etc. Further, the control of the resource may include at least one of: installing the resource, allocating the resource, instantiating the resource, activating the resource, executing the resource, configuring the resource, scaling the resource, performing NFV orchestration activities related to the resource, and communicating with the resource, etc. Still yet, in various embodiments, the control of the resource may include at least one of: incorporating the resource in a service, providing a service provisioned by the second NFV-based network to a user of the first NFV-based network, and providing a service provisioned by the first NFV-based network to a user of the second NFV-based network, etc.

Additionally, in one embodiment, the method 1300 may further include providing an NFV orchestration (NFV-O) module dedicated to the resource.

Figure 14:
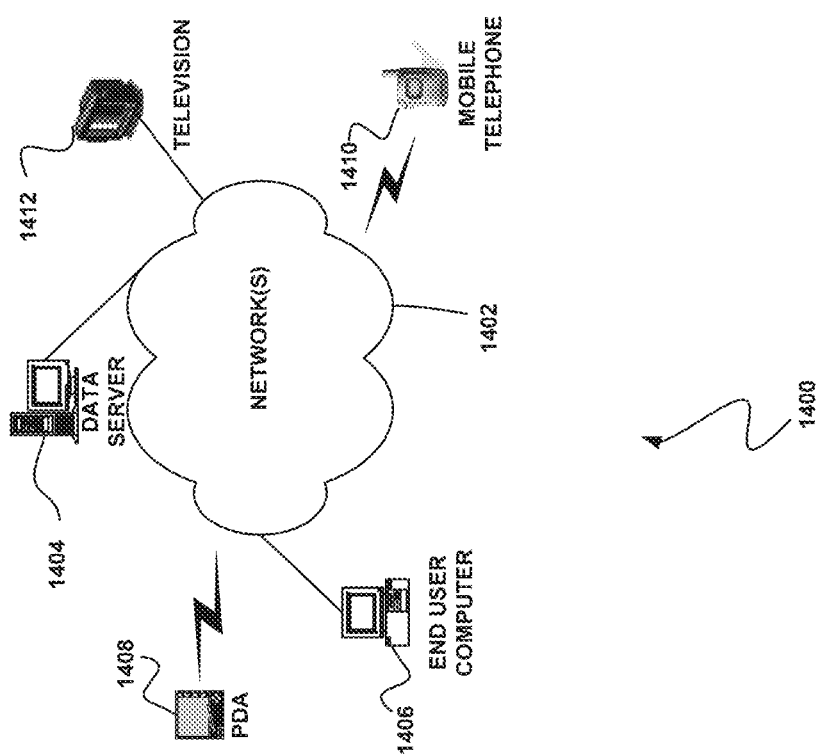
FIG. 14 illustrates a network architecture, in accordance with one possible embodiment.

FIG. 14 illustrates a network architecture 1400, in accordance with one possible embodiment. As shown, at least one network 1402 is provided. In the context of the present network architecture 1400, the network 1402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1402 may be provided.

Coupled to the network 1402 is a plurality of devices. For example, a server computer 1404 and an end user computer 1406 may be coupled to the network 1402 for communication purposes. Such end user computer 1406 may include a desktop computer, lap-top computer, and/or any other type of logic. Still yet, various other devices may be coupled to the network 1402 including a personal digital assistant (PDA) device 1408, a mobile phone device 1410, a television 1412, etc.

Figure 15:
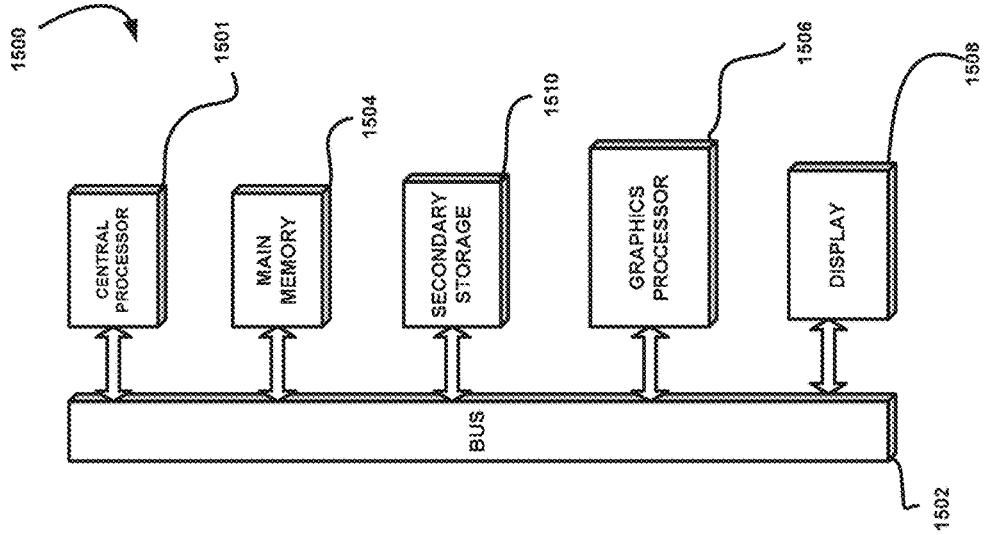
FIG. 15 illustrates an exemplary system, in accordance with one embodiment.

FIG. 15 illustrates an exemplary system 1500, in accordance with one embodiment. As an option, the system 1500 may be implemented in the context of any of the devices of the network architecture 1400 of FIG. 14. Of course, the system 1500 may be implemented in any desired environment.

As shown, a system 1500 is provided including at least one central processor 1501 which is connected to a communication bus 1502. The system 1500 also includes main memory 1504 [e.g. random access memory (RAM), etc.]. The system 1500 also includes a graphics processor 1506 and a display 1508.

The system 1500 may also include a secondary storage 1510. The secondary storage 1510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1504, the secondary storage 1510, and/or any other memory, for that matter. Such computer programs, when executed, enable the system 1500 to perform various functions (as set forth above, for example). Memory 1504, storage 1510 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette, a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:
    controlling, by a first network function virtualization based communication network (NFV-based network), a resource provided by a second NFV-based network, including:
        receiving, by a first inter-network coordination module of a first network function virtualization orchestration module (NFV-O) of the first NFV-based network from a second inter-network coordination module of a second NFV-O of the second NFV-based network, an internal security module of the second NFV-based network, wherein the first inter-network coordination module stores the internal security module of the second NFV-based network as an external security module of the first NFV-based network;
        transmitting, by the first inter-network coordination module to the second inter-network coordination module, an internal security module of the first NFV-based network, wherein the second inter-network coordination module stores the internal security module of the first NFV-based network as an external security module of the second NFV-based network;
        generating, by the first inter-network coordination module of the first NFV-based network, a request to control the resource;
        using an internal security module of the first inter-network coordination module to encrypt and authenticate the request, and then using the external security module of the first NFV-based network to encrypt and authenticate the request, by the first inter-network coordination module of the first NFV-based network;
        transmitting the encrypted and authenticated request to the second inter-network coordination module of the second NFV-based network;
        wherein the second inter-network coordination module of the second NFV-based network, upon receipt of the encrypted and authenticated request, uses the external security module of the second NFV-based network to decrypt and authenticate the request, and then uses the internal security module of the second NFV-based network to decrypt and authenticate the request, prior to processing the request.

2. The computer program product of claim 1, wherein the first inter-network coordination module is authorized by the second NFV-based network; and the second inter-network coordination module is authorized by the NFV-based network.

3. The computer program product of claim 2, wherein:
    the first inter-network coordination module is coupled to an authentication device provided by the second NFV-based network; and
    the second inter-network coordination module is coupled to an authentication device provided by the first NFV-based network.

4. The computer program product of claim 3, wherein the authentication device is at least one of a smartcard and a subscriber identification module (SIM).

5. The computer program product of claim 1, wherein the resource is at least one of: processing power, memory, storage, communication bandwidth, and a virtual network function (VNF).

6. The computer program product of claim 1, wherein the control of the resource includes at least one of: installing the resource, allocating the resource, instantiating the resource, activating the resource, executing the resource, configuring the resource, scaling the resource, performing NFV orchestration activities related to the resource, and communicating with the resource.

7. The computer program product of claim 1, wherein the control of the resource includes at least one of: incorporating the resource in a service, providing a service provisioned by the second NFV-based network to a user of the first NFV-based network, and providing a service provisioned by the first NFV-based network to a user of the second NFV-based network.

8. The computer program product of claim 1, further comprising providing an NFV orchestration (NFV-O) module dedicated to the resource.

9. A method, comprising:
    controlling, by a first network function virtualization based communication network (NFV-based network), a resource provided by a second NFV-based network, including:
        receiving, by a first inter-network coordination module of a first network function virtualization orchestration module (NFV-O) of the first NFV-based network from a second inter-network coordination module of a second NFV-O of the second NFV-based network, an internal security module of the second NFV-based network, wherein the first inter-network coordination module stores the internal security module of the second NFV-based network as an external security module of the first NFV-based network;

transmitting, by the first inter-network coordination module to the second inter-network coordination module, an internal security module of the first NFV-based network, wherein the second inter-network coordination module stores the internal security module of the first NFV-based network as an external security module of the second NFV-based network;

generating, by the first inter-network coordination module of the first NFV-based network, a request to control the resource;

using an internal security module of the first inter-network coordination module to encrypt and authenticate the request, and then using the external security module of the first NFV-based network to encrypt and authenticate the request, by the first inter-network coordination module of the first NFV-based network;

transmitting the encrypted and authenticated request to the second inter-network coordination module of the second NFV-based network;

wherein the second inter-network coordination module of the second NFV-based network, upon receipt of the encrypted and authenticated request, uses the external security module of the second NFV-based network to decrypt and authenticate the request, and then uses the internal security module of the second NFV-based network to decrypt and authenticate the request, prior to processing the request.

10. The method of claim 9, wherein the first inter-network coordination module is authorized by the second NFV-based network; and the second inter-network coordination module is authorized by the NFV-based network.

11. The method of claim 10, wherein:
the first inter-network coordination module is coupled to an authentication device provided by the second NFV-based network; and
the second inter-network coordination module is coupled to an authentication device provided by the first NFV-based network.

12. The method of claim 11, wherein the authentication device is at least one of a smartcard and a subscriber identification module (SIM).

13. The method of claim 9, wherein the resource is at least one of: processing power, memory, storage, communication bandwidth, and a virtual network function (VNF).

14. The method of claim 9, wherein the control of the resource includes at least one of: installing the resource, allocating the resource, instantiating the resource, activating the resource, executing the resource, configuring the resource, scaling the resource, performing NFV orchestration activities related to the resource, and communicating with the resource.

15. The method of claim 9, wherein the control of the resource includes at least one of: incorporating the resource in a service, providing a service provisioned by the second NFV-based network to a user of the first NFV-based network, and providing a service provisioned by the first NFV-based network to a user of the second NFV-based network.

16. A system, comprising:
one or more hardware processors for:
controlling, by a first network function virtualization based communication network (NFV-based network), a resource provided by a second NFV-based network, including:
receiving, by a first inter-network coordination module of a first network function virtualization orchestration module (NFV-O) of the first NFV-based network from a second inter-network coordination module of a second NFV-O of the second NFV-based network, an internal security module of the second NFV-based network, wherein the first inter-network coordination module stores the internal security module of the second NFV-based network as an external security module of the first NFV-based network;

transmitting, by the first inter-network coordination module to the second inter-network coordination module, an internal security module of the first NFV-based network, wherein the second inter-network coordination module stores the internal security module of the first NFV-based network as an external security module of the second NFV-based network;

generating, by the first inter-network coordination module of the first NFV-based network, a request to control the resource;

using an internal security module of the first inter-network coordination module to encrypt and authenticate the request, and then using the external security module of the first NFV-based network to encrypt and authenticate the request, by the first inter-network coordination module of the first NFV-based network;

transmitting the encrypted and authenticated request to the second inter-network coordination module of the second NFV-based network;

wherein the second inter-network coordination module of the second NFV-based network, upon receipt of the encrypted and authenticated request, uses the external security module of the second NFV-based network to decrypt and authenticate the request, and then uses the internal security module of the second NFV-based network to decrypt and authenticate the request, prior to processing the request.

* * * * *